(12) United States Patent
Ginther

(10) Patent No.: US 7,884,848 B2
(45) Date of Patent: Feb. 8, 2011

(54) VIEWING ENVIRONMENT AND RECORDING SYSTEM

(76) Inventor: Mark E. Ginther, 4608 Apricot Rd., Simi Valley, CA (US) 93063

( * ) Notice: Subject to any disclaimer, the term of this patent is extended or adjusted under 35 U.S.C. 154(b) by 997 days.

(21) Appl. No.: 11/138,597

(22) Filed: May 25, 2005

(65) Prior Publication Data
US 2006/0268102 A1    Nov. 30, 2006

(51) Int. Cl.
H04N 7/00    (2006.01)
(52) U.S. Cl. ........................................ 348/36
(58) Field of Classification Search ................. None
See application file for complete search history.

(56) References Cited

U.S. PATENT DOCUMENTS

| | | | |
|---|---|---|---|
| 1,136,236 A * | 4/1915 | Killman ........................ 352/70 |
| 5,021,954 A * | 6/1991 | Fox et al. ...................... 104/53 |
| 5,130,794 A * | 7/1992 | Ritchey ........................ 348/39 |
| 5,497,188 A * | 3/1996 | Kaye ............................ 348/36 |
| 5,602,978 A * | 2/1997 | Lastinger .................... 345/419 |
| 5,703,604 A * | 12/1997 | McCutchen .................. 345/8 |
| 5,703,961 A * | 12/1997 | Rogina et al. ............... 382/154 |
| 5,765,314 A * | 6/1998 | Giglio et al. ..................... 52/7 |
| 5,829,201 A * | 11/1998 | Schelter et al. .................. 52/9 |
| 5,850,352 A * | 12/1998 | Moezzi et al. .............. 345/419 |
| 5,888,117 A * | 3/1999 | Sutton ........................ 446/267 |
| 5,949,942 A | 9/1999 | O'Connor |
| 6,040,841 A * | 3/2000 | Cohen et al. ................. 345/473 |
| 6,072,478 A * | 6/2000 | Kurihara et al. ............. 715/203 |
| 6,141,034 A * | 10/2000 | McCutchen .................. 348/36 |
| 6,236,736 B1 * | 5/2001 | Crabtree et al. ............. 382/103 |
| 6,263,088 B1 * | 7/2001 | Crabtree et al. ............. 382/103 |
| 6,263,736 B1 * | 7/2001 | Thundat et al. ............. 73/514.36 |
| 6,295,367 B1 * | 9/2001 | Crabtree et al. ............. 382/103 |
| 6,317,166 B1 * | 11/2001 | McCutchen .................. 348/722 |
| 6,363,170 B1 * | 3/2002 | Seitz et al. ................... 382/154 |
| 6,421,459 B1 * | 7/2002 | Rowe .......................... 382/154 |
| 6,515,673 B1 * | 2/2003 | Hashimoto et al. .......... 345/582 |
| 6,522,325 B1 * | 2/2003 | Sorokin et al. .............. 345/427 |
| 6,535,226 B1 * | 3/2003 | Sorokin et al. .............. 715/723 |
| 6,559,853 B1 * | 5/2003 | Hashimoto et al. .......... 345/582 |

(Continued)

OTHER PUBLICATIONS

Int'l Searching Authority, *International Search Report and Written Opinion of the International Searching Authority for PCTUS0619844*, mailed Jun. 16, 2008, 10 pages.

*Primary Examiner*—Nhon T Diep
(74) *Attorney, Agent, or Firm*—Thomas F. Lebens; Sinsheimer Juhnke Lebens & McIvor, LLP

(57) ABSTRACT

A system for recording video comprising a plurality of cameras aligned in a substantially horizontal plane and adapted to capture images in substantially a three-hundred-sixty degree viewing angle; and a first additional camera adapted to capture images at the same time as the plurality of cameras adapted to capture images in the substantially three-hundred-sixty degree view, wherein the first additional camera is adapted to capture images in a direction above or below the horizontal plane. A system for displaying video comprising a side viewing area that provides substantially a three-hundred-sixty degree viewing area and forms at least part of a viewing pod; and at least one of atop viewing area and a bottom viewing area that forms a least a part of the viewing pod.

18 Claims, 19 Drawing Sheets

U.S. PATENT DOCUMENTS

| | | | |
|---|---|---|---|
| 6,567,086 B1 * | 5/2003 | Hashimoto | 345/427 |
| 6,583,808 B2 * | 6/2003 | Boulanger et al. | 348/14.09 |
| 6,657,667 B1 * | 12/2003 | Anderson | 348/333.12 |
| 6,669,346 B2 * | 12/2003 | Metcalf | 353/94 |
| 6,741,250 B1 * | 5/2004 | Furlan et al. | 345/427 |
| 6,747,647 B2 * | 6/2004 | Youngblood et al. | 345/427 |
| 6,778,211 B1 * | 8/2004 | Zimmermann et al. | 348/218.1 |
| 6,853,398 B2 * | 2/2005 | Malzbender et al. | 348/14.09 |
| 6,870,532 B2 * | 3/2005 | Travers et al. | 345/419 |
| 6,879,338 B1 * | 4/2005 | Hashimoto | 348/36 |
| 6,882,897 B1 * | 4/2005 | Fernandez | 700/132 |
| 6,897,338 B2 * | 5/2005 | Zhong et al. | 562/599 |
| 6,909,451 B1 * | 6/2005 | Latypov et al. | 348/14.07 |
| 6,933,966 B2 * | 8/2005 | Taylor | 348/159 |
| 7,009,561 B2 * | 3/2006 | Menache et al. | 342/463 |
| 7,015,954 B1 * | 3/2006 | Foote et al. | 348/218.1 |
| 2001/0040671 A1 * | 11/2001 | Metcalf | 353/94 |
| 2002/0041364 A1 * | 4/2002 | Ioka | 353/69 |
| 2002/0067465 A1 * | 6/2002 | Li | 352/57 |
| 2003/0006996 A1 * | 1/2003 | Youngblood et al. | 345/676 |
| 2003/0067587 A1 * | 4/2003 | Yamasaki et al. | 353/30 |
| 2004/0088077 A1 * | 5/2004 | Jouppi et al. | 700/245 |
| 2004/0117067 A1 * | 6/2004 | Jouppi | 700/259 |
| 2004/0125044 A1 * | 7/2004 | Suzuki | 345/1.1 |

* cited by examiner

VIEWING ENVIRONMENT AND RECORDING SYSTEM

BACKGROUND OF THE INVENTION

1. Field of the Invention

The present invention relates to the recording and display of video content. More specifically, the present invention relates to recording video content with multiple cameras and simultaneously displaying the video content in a viewing environment.

2. Discussion of the Related Art

Generally, a single camera records images and these images are played back through a single screen viewing system such as a projector and screen or a television. This type of entertainment has been around for many years and while the cameras and televisions have drastically improved there has been very little change in the overall viewing experience. In the most common example, people go to the movies or watch television in their living room on a single viewing screen. This type of experience is limiting in what a user can experience and see. Therefore, a camera system and viewing environment are needed which improves upon the entertainment systems currently available.

SUMMARY OF THE INVENTION

One embodiment can be characterized as a system for displaying video comprising an enclosure including side walls and at least one of a top and a bottom; and a plurality of projectors located outside of the enclosure for projecting video onto the side walls and at least one of the top and the bottom.

Another embodiment can be characterized as a system for recording video comprising a plurality of cameras aligned in a substantially horizontal plane and adapted to capture images in substantially a three-hundred-sixty degree viewing angle; and a first additional camera adapted to capture images at the same time as the plurality of cameras adapted to capture images in the substantially three-hundred-sixty degree view, wherein the first additional camera is adapted to capture images in a direction above or below the horizontal plane.

A subsequent embodiment includes a method of recording images comprising capturing images through a plurality of substantially horizontally aligned cameras; and capturing images through an additional camera aligned in a direction above or below the horizontal aligned cameras at the same time as the images are captured through the plurality of substantially horizontally aligned cameras.

Yet another embodiment can be characterized as system for displaying video comprising a side viewing area that provides substantially a three-hundred-sixty degree viewing area and forms at least part of a viewing pod; and at least one of a top viewing area and a bottom viewing area that forms a least a part of the viewing pod.

BRIEF DESCRIPTION OF THE DRAWINGS

The above and other aspects, features and advantages of the present invention will be more apparent from the following more particular description thereof, presented in conjunction with the following drawings, wherein.

Figure 1:
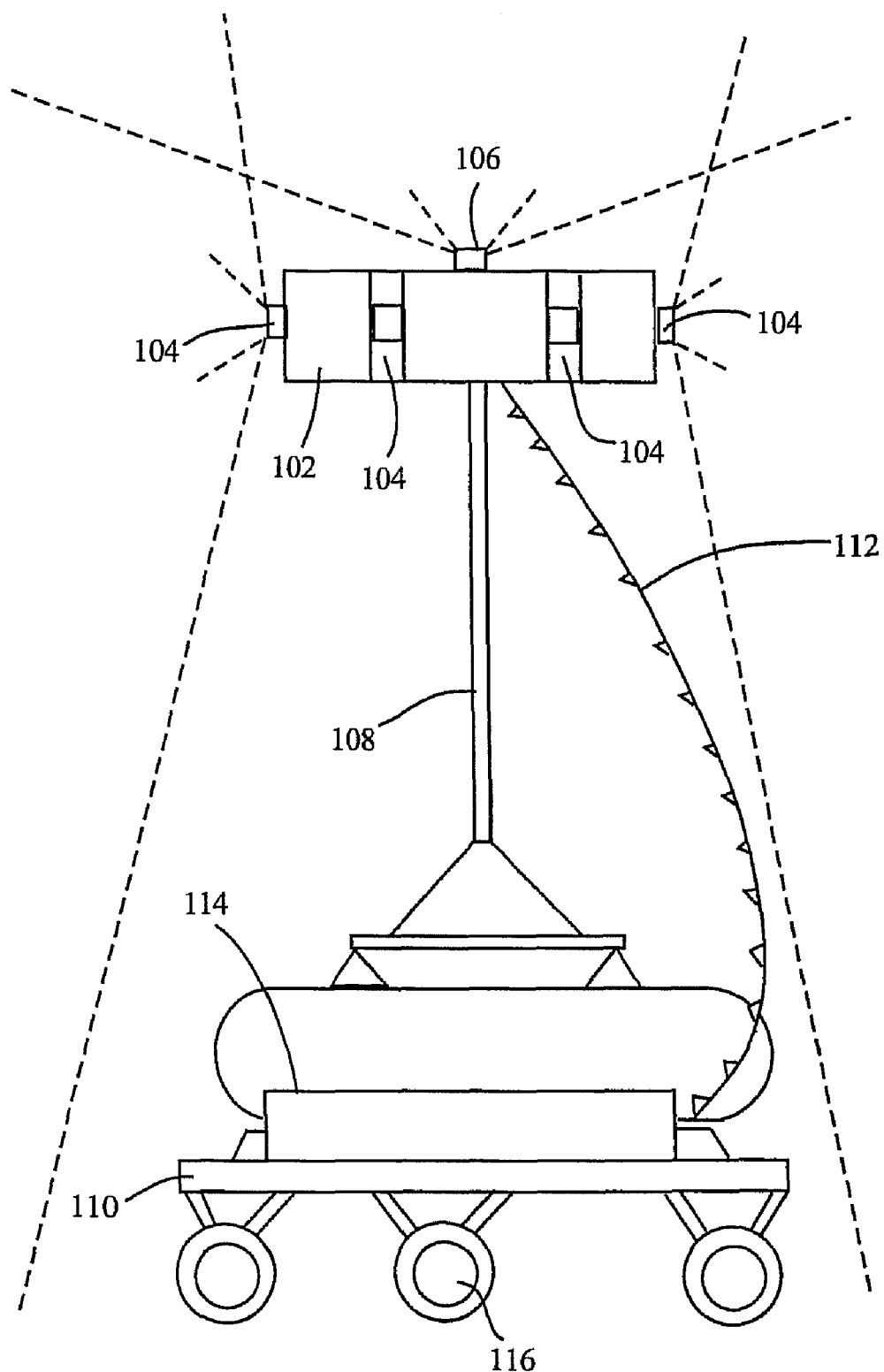
FIG. 1 is a diagram illustrating a camera system for recording video through a plurality of cameras in accordance with one embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

The following description is not to be taken in a limiting sense, but is made merely for the purpose of describing the general principles of the invention. The scope of the invention should be determined with reference to the claims. The present embodiments address the problems described in the background while also addressing other additional problems as will be seen from the following detailed description.

Referring to FIG. 1, a diagram is shown illustrating a camera system for capturing and recording video through a plurality of cameras in accordance with one embodiment. Shown is a chassis 102, a plurality of horizontally aligned cameras 104, a top camera 106, a stand 108, a base 110 of the camera system, a video cable 112, a video recording bank 114, and a plurality of wheels 116.

The plurality of horizontally aligned cameras 104 and the top camera 106 are mounted on the chassis 102. The stand 108 is coupled to a bottom of the chassis 102 and to the base 110 of the camera system. The plurality of horizontally aligned cameras 104 and the top camera 106 are electrically coupled to the video recording bank 114 through the video cable 112. The video recording bank 114 is supported by the base 110.

In one embodiment, the plurality of horizontally aligned cameras 104 and the top camera 106 have wide angle lenses. The video recording bank 114 records the images from the plurality of horizontally aligned cameras 104 and the top camera 106. The recorded images preferably have overlapping areas with each adjacent camera. That is, in one embodiment, each of the plurality of horizontally aligned cameras 104 captures images that are recorded by the video recording bank 114 that overlap area with the images captured by both the camera to the left and the camera to the right. Additionally, there is an overlapping area between the top camera and each of the plurality of horizontally aligned cameras. Therefore, the captured images, when combined, capture images in a three-hundred-sixty degree horizontal-viewing plane and additionally capture an image in a direction normal to the horizontal viewing plane (e.g., in an upward direction). As will be described more in detail herein with reference to FIG. 8, the recorded images can be later projected and combined onto a viewing pod such that a seamless viewing environment is created. It should be understood that in one embodiment the top camera only need to be aligned in a substantially normal direction to the plurality of horizontally aligned cameras so long as the recorded image of the top camera overlaps with the recorded images from the plurality of horizontally aligned cameras. Additionally, the plurality of horizontally aligned cameras 104 only need to be aligned in a substantially horizontal plane, so long as there is overlapping of the recorded images with an adjacent horizontally aligned camera 104 and the top camera 106. This provides for a seamless viewing area that can be displayed, for example, on the viewing pod shown in FIG. 8.

In some embodiments, the captured viewing area does not completely overlap. The images that do not overlap are displayed, in one embodiment, in the viewing pod shown in FIGS. 19 and 20.

In other embodiments, more than one camera is used in place or in addition to the top camera. For example, two or more cameras are aligned to capture images in a direction that is above the plane in which the plurality of horizontally aligned cameras are aligned. Thus, in the embodiments described herein, at least one camera is positioned to capture images in a direction that is above the plane in which the plurality of horizontally aligned cameras are aligned. As shown, the top camera is pointed in a direction normal (or 90 degrees above) to the plane in which the plurality of horizontally aligned cameras are pointed.

The video recording bank 114 is positioned at the base of the camera system. Each camera is coupled to a video recorder that records the images captured by the camera. The video recording bank 114 records the images from the cameras onto any type of recording media, such as, for example, a video tape, a digital video recorder, a hard drive, or a removable hard drive. In one embodiment, the cameras record video in accordance with high definition television (HDTV) standards.

In one embodiment, the plurality of horizontally aligned cameras 104 are positioned approximately the height of the eyes of an average person. Thus, the viewpoint of the camera is essentially the same as the viewpoint of a person who is standing. In one embodiment, the base 110 includes a gyroscope that helps to keep the camera system moving in a smooth fashion so as not to record jerky or bouncing images. Additionally, the base 110 optionally includes the plurality of wheels 116 and a drive mechanism as will be described herein with reference to FIGS. 3-5. As the camera system moves, the viewpoint of the cameras is essentially the same as the viewpoint of a person who is walking. As will be described in greater detail herein, when the recorded video is later played back, for example, in the viewing pod shown in FIG. 8, a person inside the viewing pod will experience the video as if they were actually present when the video was being recorded. A stationary camera system is used in some embodiments.

The camera system additionally records audio in addition to recording video. Preferably, each camera records two channel sound such as is known in the art. The audio is played back in the viewing pod as will be described below with reference to FIG. 8.

Figure 2:
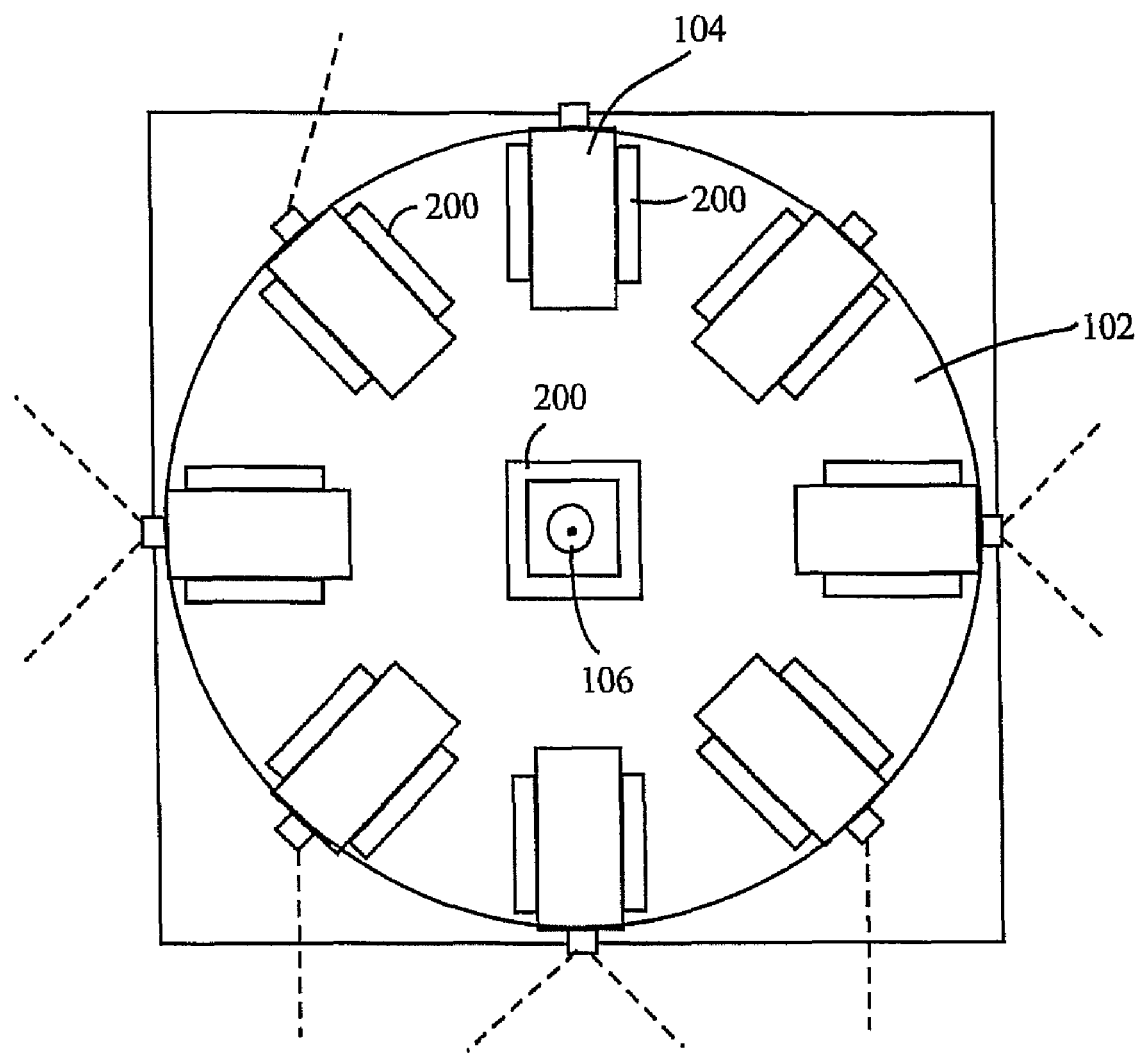
FIG. 2 is a diagram illustrating a top view of the camera system shown in FIG. 1 in accordance with one embodiment.

Referring to FIG. 2 a diagram is shown illustrating a top view of the camera system shown in FIG. 1 in accordance with one embodiment. Shown is the plurality of horizontally aligned cameras 104, the top camera 106, the chassis 102, and a plurality of adjustable mounting plates 200.

As described above with reference to FIG. 1, the plurality of horizontally aligned cameras 104 and the top camera 106 are positioned on the chassis in order to have overlapping views in accordance with one embodiment. The plurality of horizontally aligned cameras 104 and the top camera 106 are attached to the chassis 102 on the adjustable mounting plates 108. The adjustable mounting plates 108 allow the cameras to be adjusted up/down, left/right and in/out. This allows the cameras to be aligned and adjusted while filming. Depending upon how wide of an angle the lenses of the cameras are capable of viewing, this can change the number of cameras that are utilized in order to have recorded images that can be later displayed in a seamless manner. Thus, in alternative embodiments a greater or lesser number of cameras are used. As described above, the embodiment illustrated utilizes wide angle lens cameras.

Figure 3:
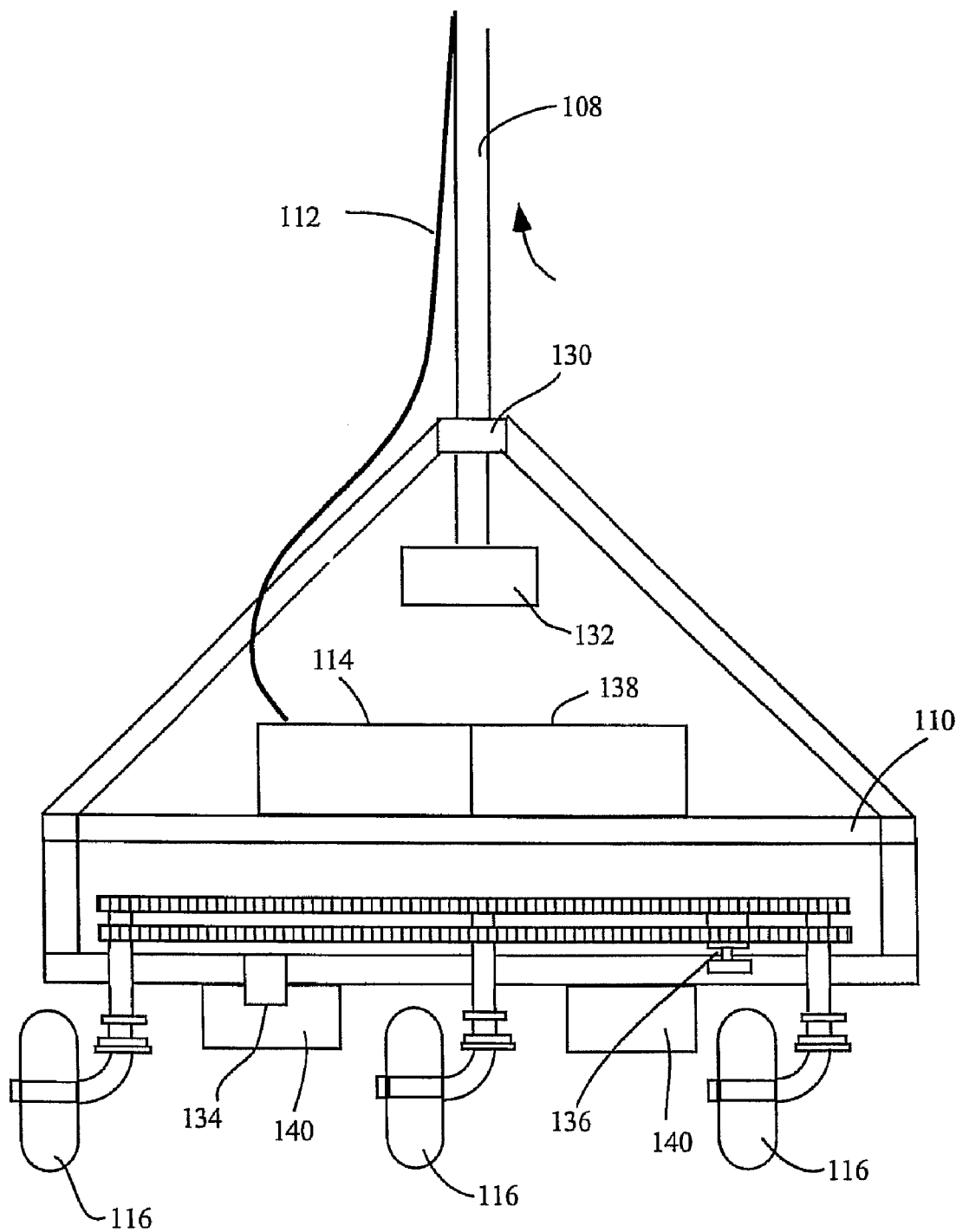
FIG. 3 is a diagram illustrating a side view of the base of the camera system shown in FIG. 1 in accordance with one embodiment.

Referring to FIG. 3, a diagram is shown illustrating a side view of the base of the camera system shown in FIG. 1 in accordance with one embodiment. Shown is the stand 108, the base 110, a flouting knuckle 130, a gyro stabilizer 132, the video cable 112, the video recording bank 114, a drive motor 134, a turning motor 136, the plurality of wheels 116, a control unit 138, and batteries 140.

The batteries 140 are attached to the base 110 of the camera system. The batteries 140 provide power to the drive motor 134, the turning motor 136, the video recording bank 114, the control unit 138 and the cameras (shown in FIGS. 1 and 2).

The control unit 138 is, for example, a computer system that controls the video recording bank 114, the cameras, the drive motor 134 and the turning motor 136. In one embodiment, the control unit 138 includes a receiver (e.g., a wireless receiver) such that the camera system can be operated remotely from a remote control unit. By using the remote control unit and by having the batteries directly on the camera system, video can be taken in all directions without film crew, cables, or other items associated with filming in view of the cameras. This provides for a unique and complete visual experience for a viewer of the video.

The gyro stabilizer 132 and the floating knuckle 130 are optionally included in order to provide for smooth movement of the cameras. This prevents the video from having generally undesirable jerky movements.

The drive motor 134 is coupled to the plurality of wheels 116. The turning motor 136 is also coupled to the plurality of wheels 116. Both the drive motor 134 and the turning motor 136 are controlled by the control unit 138. The operation of the drive motor 134 and the turning motor 136 will be described in greater detail herein with reference to FIG. 4.

Figure 4:
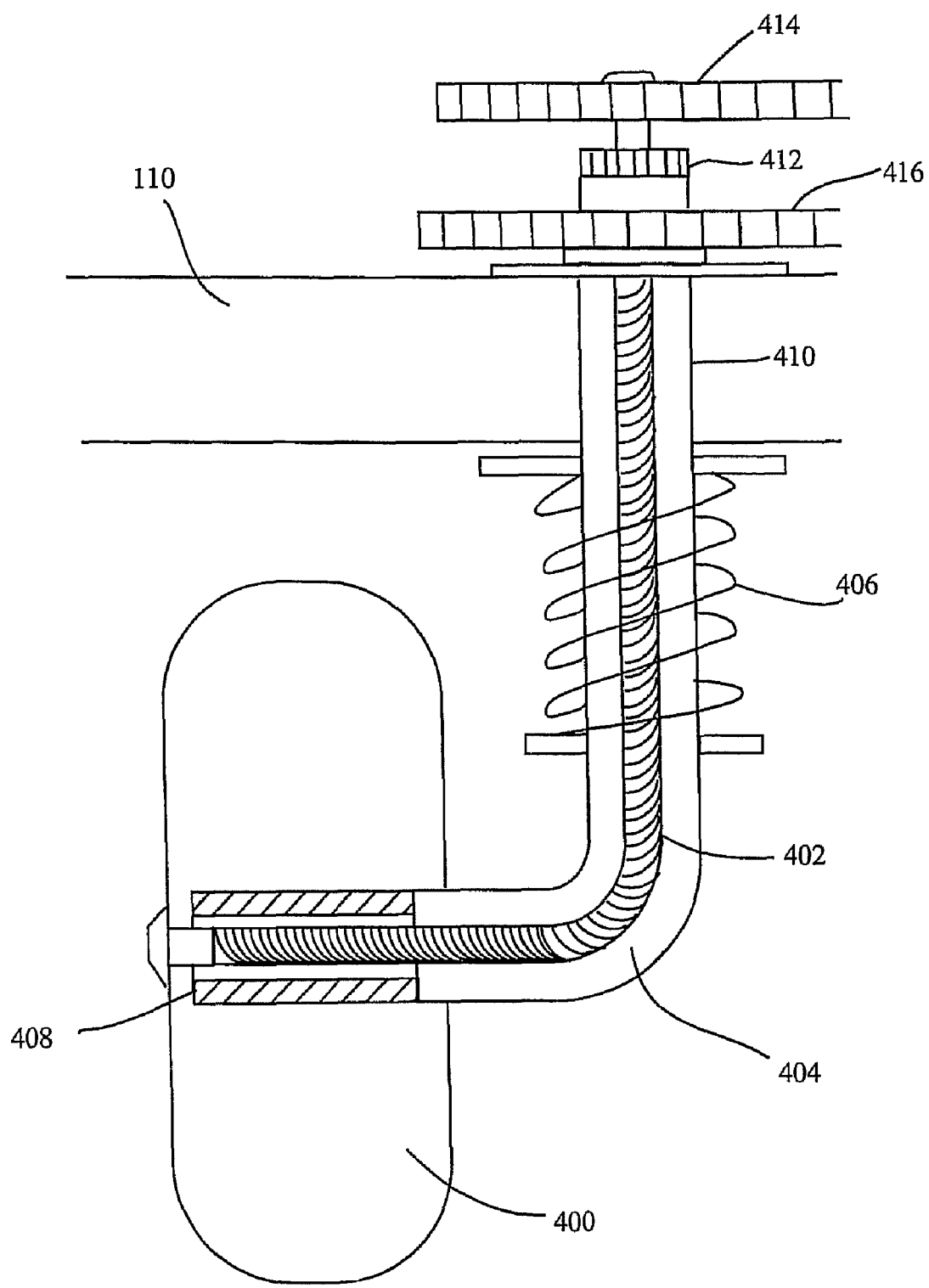
FIG. 4 is a diagram illustrating the wheel assembly for the base of the camera system shown in FIG. 3 in accordance with one embodiment.

Referring to FIG. 4, a diagram is shown illustrating the wheel assembly for the base of the camera system shown in FIG. 3 in accordance with one embodiment. Shown is a wheel 400, a flexible drive shaft 402, a wheel support 404, a spring 406, a first bearing 408, a second bearing 410, a third bearing 412, a drive sprocket 414, a turning sprocket 416, and the base 110 of the camera system.

The drive sprocket 414 is connected to the drive motor (shown in FIG. 3) through a drive chain (shown in FIG. 5) and also connected to the flexible drive shaft 402. The flexible drive shaft 402 is connected to the wheel 400. The turning sprocket 416 is connected to the turning motor (shown in FIG. 3) through the turning chain (shown in FIG. 5). The turning sprocket 416 is also connected to the wheel support 404 which is connected to the wheel 400.

In operation, the drive motor 134 turns the drive sprocket 414 which rotates the flexible drive shaft 402. The flexible draft shaft 402 rotates the wheel 400 which allows the camera system to move. The turning motor 136 rotates the turning sprocket 416 which in turn rotates the wheel support 404. As the wheel support 404 rotates, the wheel to the left or to the right which allows the camera system to change direction while moving. The motor operation is further discussed with reference to FIG. 5. All of the wheels on the camera system work in the same manner as illustrated in FIG. 4.

Figure 5:
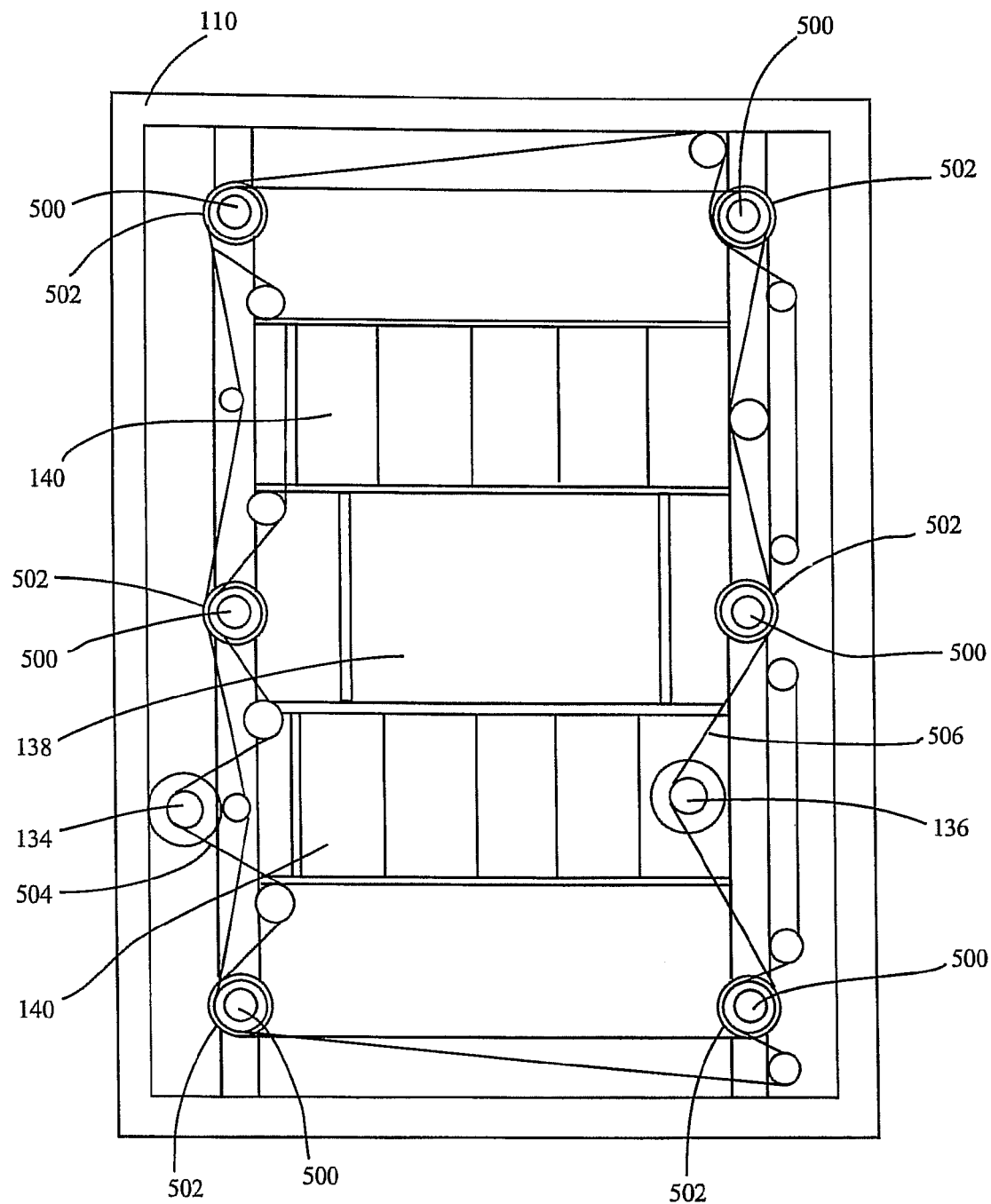
FIG. 5 is a diagram illustrating a top view of the base of the of camera system shown in FIG. 1 in accordance with one embodiment.

Referring to FIG. 5, a diagram is shown illustrating a top view of the base of the of camera system shown in FIG. 1 in accordance with one embodiment. Shown is the base 110, the control unit 138, the batteries 140, the drive motor 134, the turning motor 136, a plurality of turning sprockets 500, a plurality of drive sprockets 502, a drive chain 504 and a turning chain 506.

The drive motor 134 is coupled to the drive chain 504 which in turn is coupled to the plurality of drive sprockets 502. As shown, there are six drive sprockets (one for each wheel of the present embodiment). In operation, the drive motor 134 is powered by the batteries 140 and as the drive motor 134 rotates the drive chain 504 moves. The movement of the drive chain 504 in turn causes the plurality of drive sprockets 504 to rotate. As described above, with reference to FIG. 4, turning the drive sprockets 504 causes the wheels 116 to rotate and the camera system to move.

The turning motor 136 is coupled to the turning chain 506 which in turn is coupled to the plurality of turning sprockets 500. As shown, there are six turning sprockets (one for each wheel of the present embodiment). In operation, the turning motor 136 is powered by the batteries 140 and as the turning motor 136 rotates the turning chain 506 will move. The movement of the turning chain 506 in turn causes the plurality of turning sprockets 500 to rotate. It should be understood that the number of wheels on the camera system can be varied. Additionally, in some embodiments, the camera system is stationary and thus the base does not include the plurality of wheels 116, the drive motor 134, or the turning motor 136.

Figure 6:
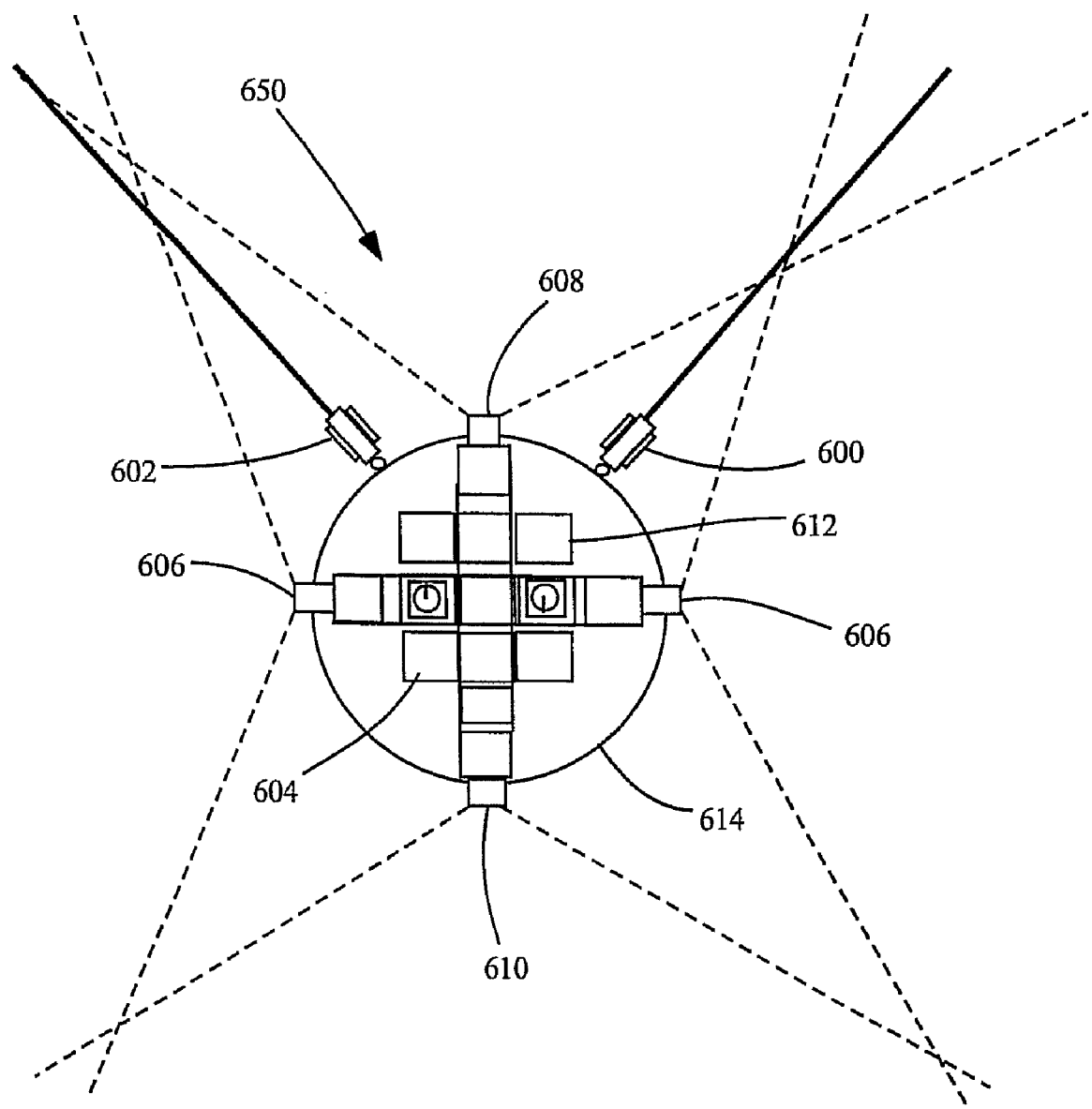
FIG. 6 is a diagram illustrating a camera system for recording video through a plurality of cameras in accordance with another embodiment.

Referring to FIG. 6 a diagram is shown illustrating a camera system 650 for recording video through a plurality of cameras in accordance with another embodiment. Shown is a first double cable sheave 600, a second double cable sheave 602, a chassis 604, a plurality of horizontally aligned cameras 606, a top camera 608, a bottom camera 610, a control unit 612 and a housing 614.

The chassis 604 is attached to and supports the plurality of horizontally aligned cameras 606, the top camera 608, the bottom camera 610 and the control unit 612. The housing 614 is, for example, a plastic protective structure that encloses the chassis 604 and control unit 612. The housing 614 includes holes that are aligned with the cameras such that the view of the cameras is not impeded by the housing 614. As will be described below with reference to FIG. 7, the first double cable sheave 600 and the second double cable sheave 602 suspend the camera system in the air and also provide for a means to move the camera system. The first double cable sheave 600 and the second double cable sheave 602 are attached to the housing 614 in order to suspend the camera system in the air. Alternatively, the first double cable sheave 600 and the second double cable sheave 602 are attached to the chassis 604 or to both the chassis 604 and the housing 614 in order to securely suspend the camera system in the air.

In the present embodiment, the control unit includes a transmitter for transmitting the images recorded by the cameras over a transmission channel to a remote receiver (not shown) and subsequently stored in a remote video recorder (not shown). In an alternative embodiment, each camera individually includes a transmitter for sending the images to the remote receiver and the remote video recorder.

The present embodiment of the camera system allows the camera system to move off the ground and maneuver into many different types of places. Having this capability allows for the camera system to record video, for example, as it moves down streets, over buildings, around buildings, or high above any other type of scene from a ground take off. Later when played back in a view pod (such as will be described herein with reference to FIGS. 8-20) a person could experience, for example, a gondola ride up the side of a mountain or a flight.

In some embodiments, more than one camera is used in place or in addition to the top camera and the bottom camera. For example, two or more cameras are aligned to capture images in a direction that is above the plane in which the plurality of horizontally aligned cameras are aligned. Thus, in the embodiments described herein, at least one camera is positioned to capture images in a direction that is above the plane in which the plurality of horizontally aligned cameras are aligned. As shown, the top camera is pointed in a direction normal (or 90 degrees above) to the plane in which the plurality of horizontally aligned cameras are pointed. Similarly, at least one camera is positioned to capture images in a direction that is below the plane in which the plurality of horizontally aligned cameras are aligned. As shown, the bottom camera is pointed in a direction normal (or 90 degrees below) to the plane in which the plurality of horizontally aligned cameras are pointed.

Figure 7:
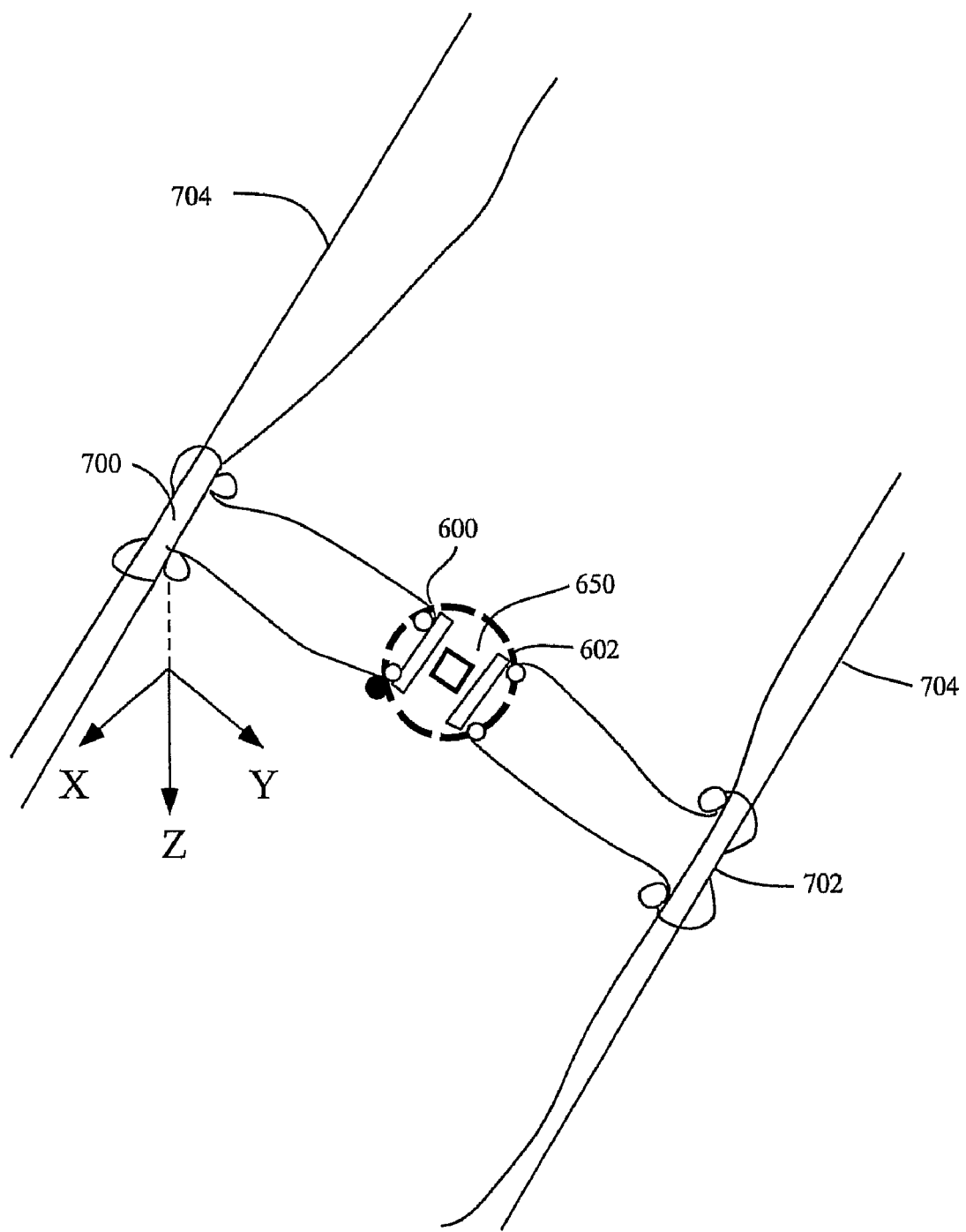
FIG. 7 is a diagram illustrating the camera system of FIG. 6 connected to a cable system in accordance with one embodiment.

Referring to FIG. 7, a diagram is shown illustrating the camera system of FIG. 6 connected to a cable system in accordance with one embodiment. Shown is a first camera traveler 700, a second camera traveler 702, support cables 704, the first double cable sheave 600, the second double cable sheave 602, and the camera system 650. The first camera traveler 700 and the second camera traveler 702 move along the support cables 704 and move the camera system 650 along a first axis X. The first double cable sheave 600 and the second double cable sheave 602 act together to move the camera system 650 along both a second axis Y and a third axis Z. Cabling systems such as shown are known in the art for use with a single camera, however have not been utilized with the camera system described above with reference to FIG. 6.

Figure 8:
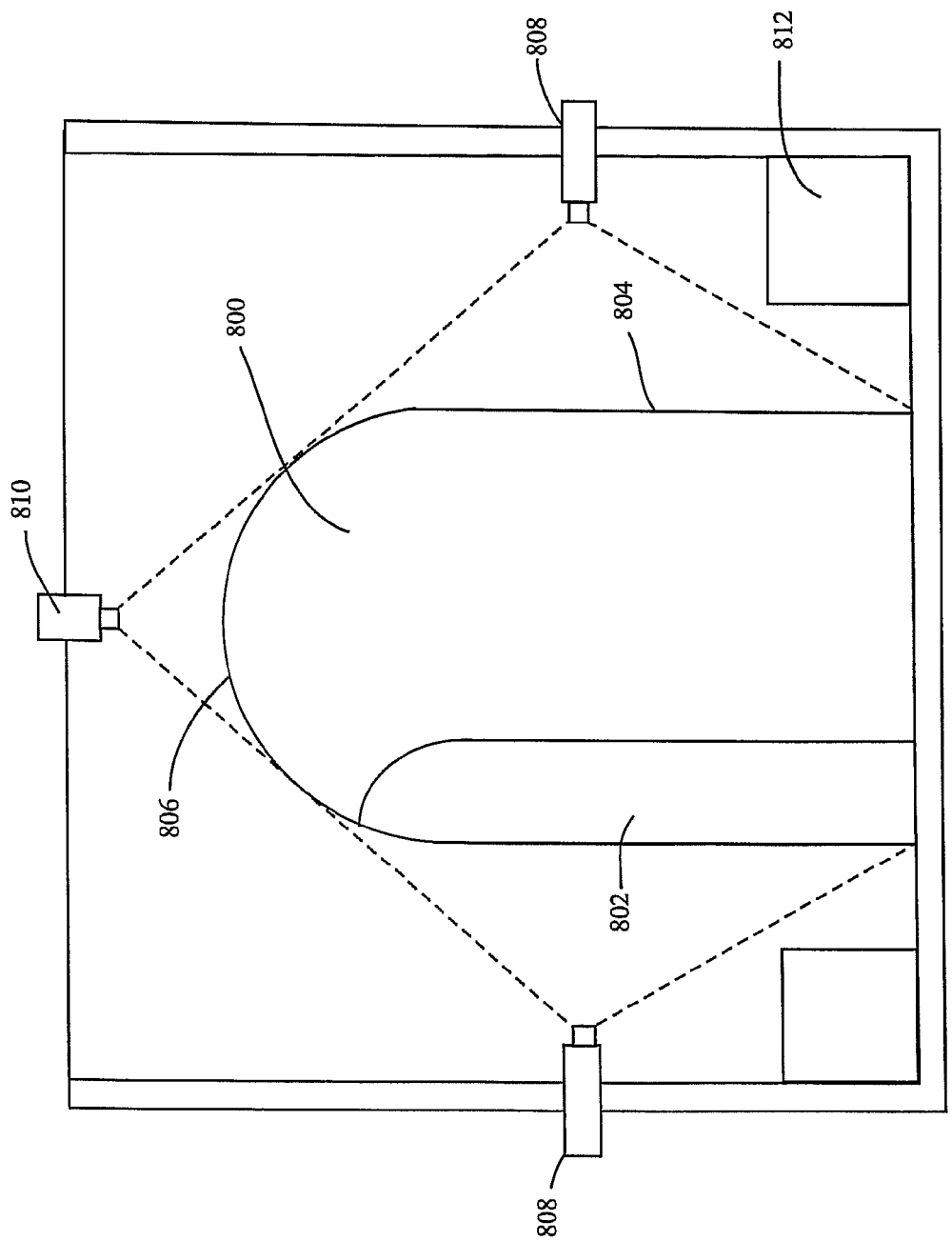
FIG. 8 is a diagram illustrating a viewing pod in accordance with one embodiment.

Referring to FIG. 8 a diagram is shown illustrating a viewing pod system in accordance with one embodiment. Shown is a viewing pod 800 including a door 802, a side portion 804, and a dome portion 806. Also shown are a plurality of side projectors 808, a top projector 810 and a control unit 812.

The viewing pod, in one embodiment, is constructed from a plastic material that is smooth on an inside surface and opaque on an outside surface in order to provide a projection surface. Other materials are used in alternative embodiments, so long as the image from the projectors can be seen from the inside of the viewing pod. The door 802 is used to enter and exit the viewing pod 800.

The plurality of side projectors 808 and the top projector 810, project images onto the outer surface of the viewing pod 800. For example, the projectors can project the images recorded with the camera systems shown and described above with reference to FIGS. 1-7 onto the viewing pod 800. Alternatively, the projectors can project animated images onto the outside of the viewing pod such as images from a video game or animated movie. The plurality of side projectors 808 and the top projector 810 are aligned such that the images are projected in a seamless manner onto the viewing pod in accordance with one embodiment. When the viewing pod is used to show the images that were recorded using, for example, one of the camera systems shown in FIGS. 1-7, there are an equal number of the horizontally aligned cameras (shown in FIG. 1) and the plurality of side projectors 808. Therefore, each of the recorded images that were recorded with the plurality of horizontally aligned cameras is projected from a corresponding side projector. Similarly, the images recorded by the top camera are projected onto the dome portion 806 of the viewing pod 800 from the top projector 810. Preferably, the images projected onto the viewing pod are high definition images.

Some prior systems have attempted to provide a video image display that provides a viewing area of more than a single flat viewing screen. However, these systems only provide a dome shaped viewing area and do not include side wall portions of the viewing area. This is because generally, the camera system used to capture the images is designed to display the images onto a curved surface.

The viewing pod 800 thus provides a viewing environment that is able to put the viewer into a completely surrounded environment as if the viewer was actually experiencing the previously recorded video. For example, the viewing pod 800 can be used to have people experience places such as the Great Wall of China, coral reefs, the top of the Himalayas, a sporting event or any other type of experience that many people would not normally be able to experience. Additionally, the viewing pod 800 provides for a unique experience for each person that uses the pod. Because the viewing area is three-hundred-sixty degrees around and on top of the pod, each person who uses the pod will can look in different directions and experience. Additionally, a user can view the same video presentation more than one time and have a different experience each time. Just as if two people were walking along a trail, each would look in different directions and see different sites, the same will happen for two different people in the viewing pod 800. Therefore, the viewing pod provides a unique user experience that could not previously be accomplished without actually going to the destination.

In one embodiment, the viewing pod includes a floor screen. For example, a plasma or LCD screen can be positioned in the floor and covered by glass. The floor screen is utilized to show, for example, video recorded with the bottom camera described above with reference to FIG. 6.

The viewing pod also preferably includes an audio system (not shown). In accordance with one embodiment, audio that was recorded, for example, using the camera system of FIG. 1 is synchronously played back through speakers into the viewing pod. In one embodiment, the audio is standard two channel sound and each projector has a two channel feed associated with the video that is played back through the projector. Thus, in this embodiment, there are eighteen speakers that produce sound in the viewing pod.

As described above with reference to FIGS. 1 and 6, some embodiments or the camera system include more than one camera aligned to capture images in a direction that is above the plane in which the plurality of horizontally aligned cameras are aligned. Therefore, in some embodiments, more than one projector can be utilized in order to project images onto the dome portion 806 of the viewing pod 800.

Figure 9:
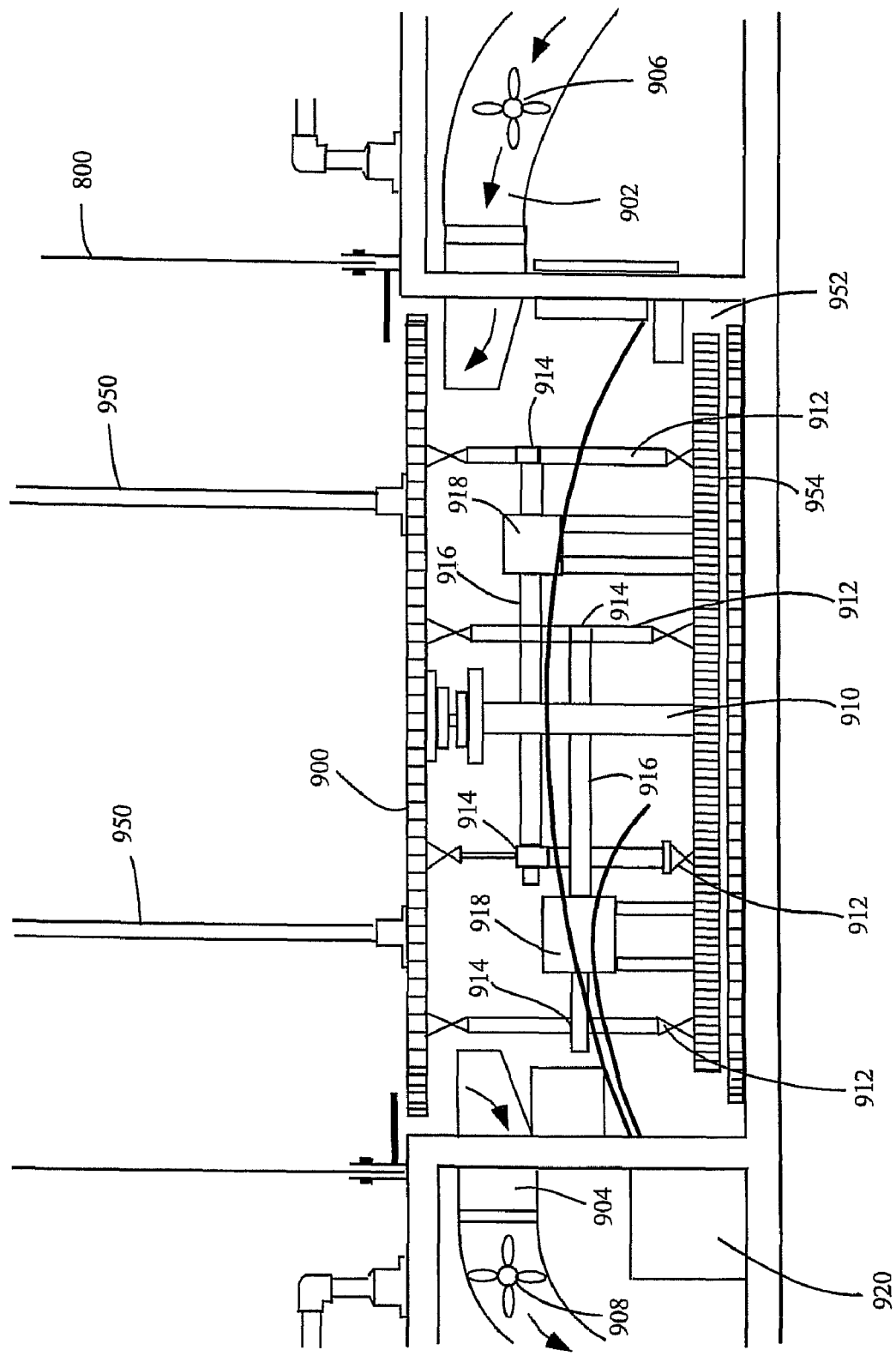
FIG. 9 is a diagram illustrating a base for the viewing pod shown in FIG. 8 in accordance with one embodiment.

Referring to FIG. 9 a diagram is shown illustrating a base for the viewing pod shown in FIG. 8 in accordance with one embodiment. Shown is a floor 900, the viewing pod 800, an air inlet 902, an air outlet 904, an inlet fan 906, an outlet fan 908, a center support 910, a plurality of movable supports 912, a plurality of cams 914, a plurality of transfer members 916, a plurality of motors 918, a computer 920, hand rails 950, a stepper motor 952 and a rotating support 954.

The floor 900 is supported by the plurality of movable supports 912 and the center support 910. The movable supports 912 are coupled to the plurality of motors 918 through the plurality of cams 914 and the plurality of transfer members 916. In operation, the plurality of motors 918 in combination with the plurality of movable supports 912, the plurality of cams 914, and the plurality of transfer members 916 control movement of the floor 900 within the viewing pod 800. The plurality of motors 918 are, for example, DC step motors that move the transfer members 916 in a horizontal direction. The horizontal movement of the transfer members 916 is translated by the cams 914 into vertical movement of the movable supports 912 which in turn causes the floor 900 to move up and down. The plurality of motors 918 are electrically coupled to the computer 920. The computer 920 controls the operation of the plurality of motors 918. In one embodiment, the computer 920 also controls the playback of recorded video that is being displayed in the viewing pod 800. The movement of the floor 900 is synchronized to the video that is being displayed in order to add to the viewing environment.

The floor 900 also rotates in accordance with one embodiment. The floor 900 is coupled to the rotating support 954 through the plurality of movable supports 912. The stepper motor 952 is geared to the rotating support 954 and can rotate the floor 900 in either direction. As the rotating support 954 rotates, the floor 900 and the moveable supports 912 also rotate. In one embodiment the floor rotates to mirror the movements of the base of the camera system shown in FIG. 1, so a person in the viewing pod will have the impression of moving in the same manner as the camera system moved. When utilized with, for example, a video game, a user can control the rotation of the floor by making choices of where to move, for example, going left or right at the end of a hall by controlling how the floor rotates. A user controls the rotation of the floor through computer control in accordance with one embodiment.

In one embodiment, the floor 900 is made from metal grating. The air inlet 902 and the air outlet 904, in combination with the metal grating allow for air to circulate through the viewing pod 800. The inlet fan 906 forces air through the air inlet 902, up through the floor 900, and into the viewing pod 800. The outlet fan 908 draws air out of the viewing pod through the air outlet 904.

The hand rails 950 are attached in the middle of floor 900 the viewing pod 800. When the floor 900 is moving a person can hold onto the hand rails 950 in order to keep their balance. The hand rails 950 and the door (shown in FIG. 8) are designed, in one embodiment, to be handicap accessible.

Figure 10:
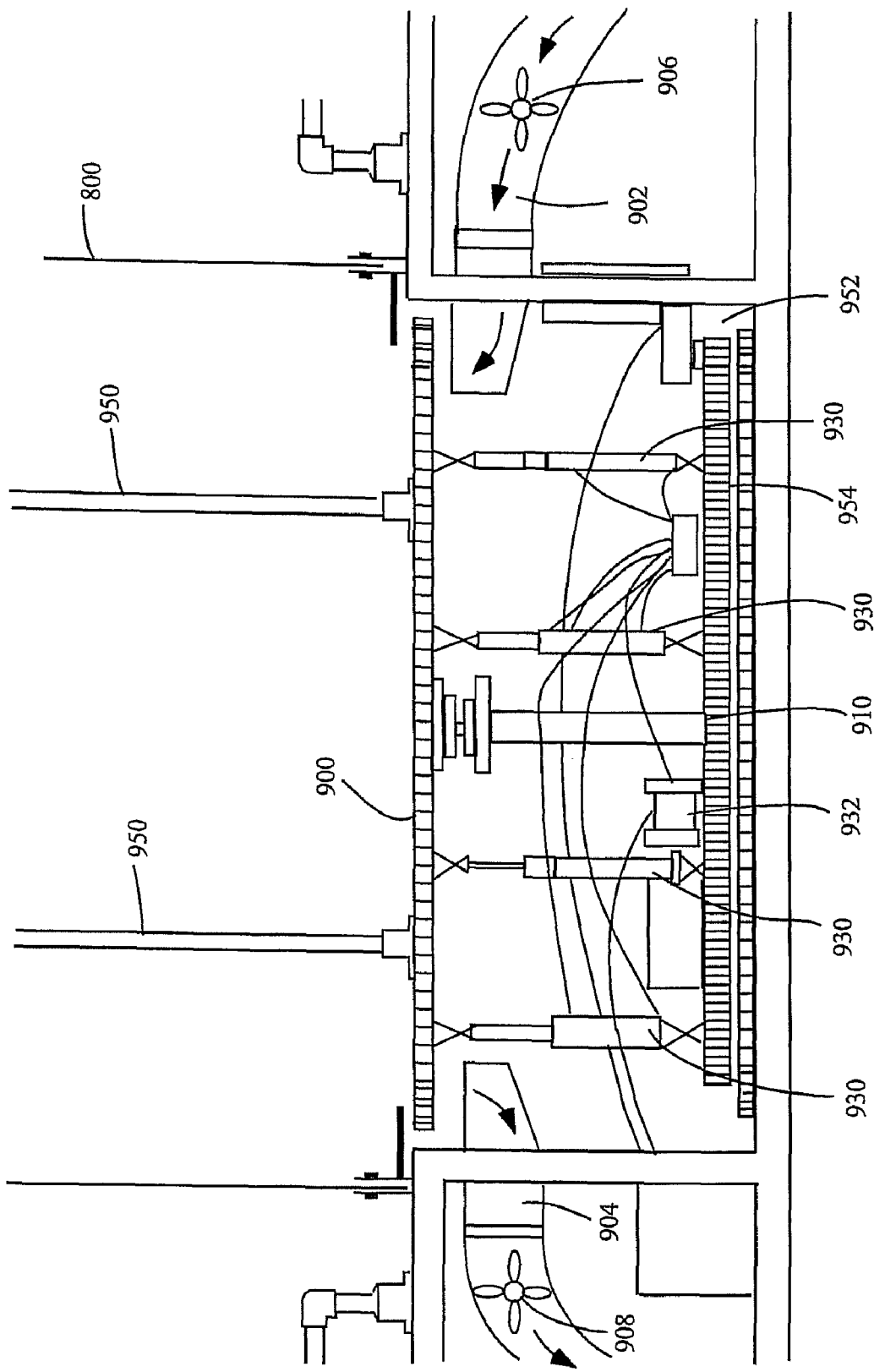
FIG. 10 is a diagram illustrating a base for the viewing pod shown in FIG. 8 in accordance with an alternative embodiment.

Referring to FIG. 10 a diagram is shown illustrating a base for the viewing pod shown in FIG. 8 in accordance with an alternative embodiment. Shown is the floor 900, the viewing pod 800, the air inlet 902, the air outlet 904, the inlet fan 906, the outlet fan 908, the center support 910, a plurality of movable hydraulic supports 930, a hydraulic system 932, the computer 920, the stepper motor 952 and the rotating support 954.

The hydraulic system 932 in combination with the movable hydraulic supports moves the floor 900 up or down. The floor pivots about the center support 910 as the movable hydraulic supports 930 move up or down. The computer 920 is electronically coupled to the hydraulic system 932 and controls the operation of the hydraulic system 932. Hydraulic systems are know in the art and will thus not be discussed in more detail herein.

Figure 11:
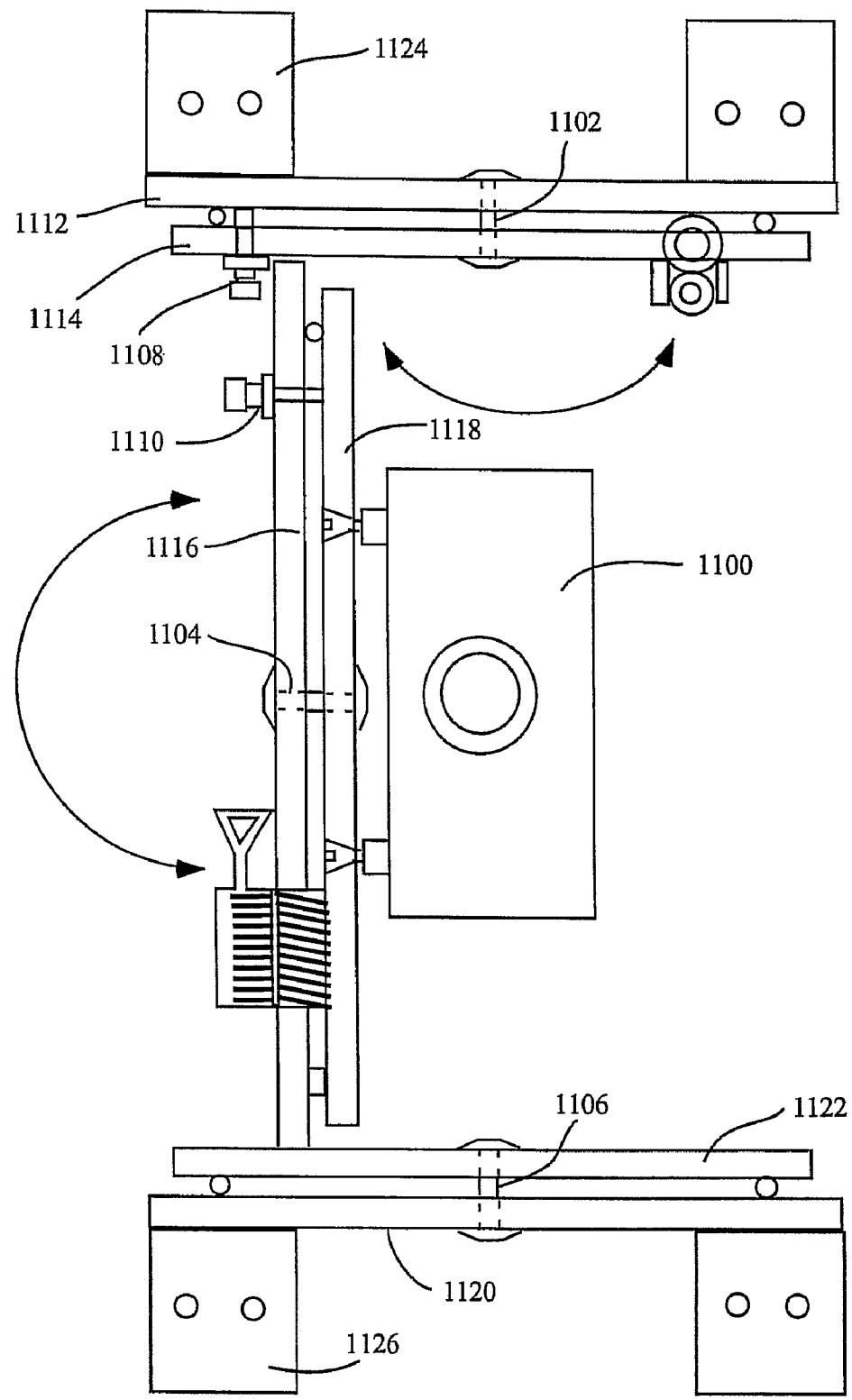
FIG. 11 is a diagram illustrating a projector mounting system in accordance with one embodiment.

Referring to FIG. 11 a diagram is shown illustrating a projector mounting system in accordance with one embodiment. Shown is a projector 1100, a top bolt 1102, a side bolt 1104, a bottom bolt 1106, a top plate lock 1108, a side plate lock 1110, a first top plate 1112, a second top plate 1114, a first side plate 1116, a second side plate 1118, a first bottom plate 1120, a second bottom plate 1122, a top set of rail clamps 1124, and a bottom set of rail clamps 1126.

The projector mounting system is used, for example, to secure the projectors shown in FIG. 8, to a mounting surface (e.g., a ceiling or a wall). The top set of rail clamps 1124 and the bottom set of rail clamps 1126 are attached to the mounting surface. The first set of rail clamps 1124 is also attached to the first top plate 1112. The second top plate 1114 is pivotally coupled to the first top plate 1112 through the top bolt 1102. The second top plate 1114 is also attached to the first side plate 1116 which is attached to the second bottom plate 1112. The first side plate 1116 is pivotally coupled to the second side plate 118 through the side bolt 1104. The projector 1100 is attached to the second side plate 1118. The bottom set of rail clamps 1126 is attached to the first bottom plate 1120. The first bottom plate 1120 is pivotally coupled to the second bottom plate 1122 through the bottom bolt 1106. The top plate lock 1108, when tightened, prevents relative motion between the first top plate 1112 and the second top plate 1114 and between the first bottom plate 1120 and the second bottom plate 1122. Similarly, the side plate lock 1110, when tightened, prevents relative motion between the first side plate 1116 and the second side plate 1118.

The top bolt 1102 and the bottom bolt 1106 provide a first pivotal axis which allows the projector to be adjusted left and right. The side bolt 1104 provides a second pivotal axis which allows the projector to be adjusted up and down. Being able to adjust the projector allows the video from each of the projectors shown in FIG. 8 to be properly projected onto the viewing pod 800 such that in one embodiment a seamless image is viewed from inside the viewing pod 800. The mounting system shown is but one example of a mechanism for adjusting the projectors and it should be understood that many alternative designs can be used.

Figure 12:
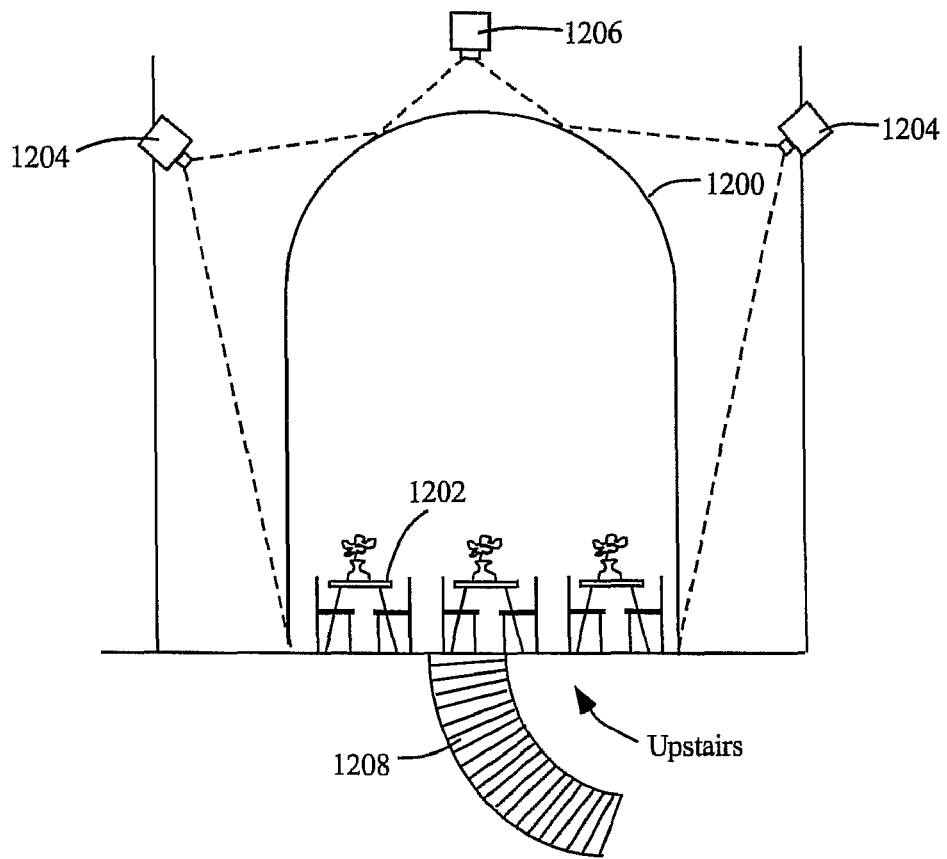
FIG. 12 is a diagram illustrating a dining viewing pod in accordance with one embodiment.
Figure 13:
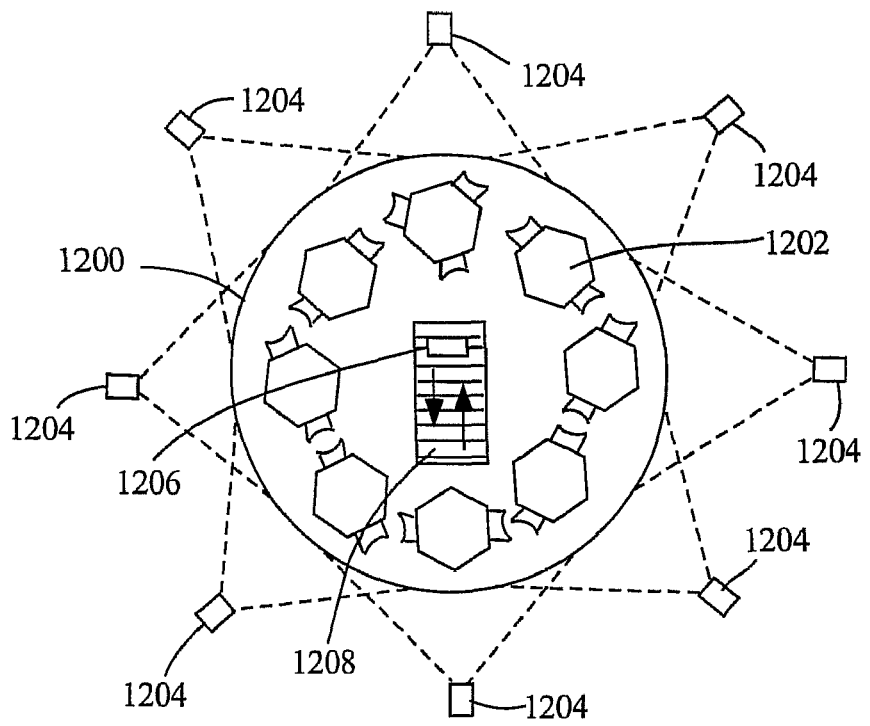
FIG. 13 is a diagram illustrating a top view of the dining viewing pod shown in FIG. 12.

Referring to FIG. 12 a diagram is shown illustrating a dining viewing pod in accordance with one embodiment. FIG. 13 is a diagram illustrating a top view of the dining viewing pod shown in FIG. 12. Shown is a viewing pod 1200, a plurality of tables 1202, a plurality of side projectors 1204, a top projector 1206, and a staircase 1208.

The staircase 1208 is centered in the middle of the viewing pod 1200 as an exit and entrance into the viewing pod 1200. The tables 1202 are placed around the staircase 1208. The tables 1202 are arranged such that everyone sitting in the room has a good view of much of the viewing pod 1200. The plurality of side projectors 1204 and the top projector 1206 project images onto the outside of the viewing pod 1200. The viewing pod 1200, thus, provides a unique dining environment that can be regularly changed by simply playing a new video or displaying new images. For example, the camera system shown in FIG. 1 could be used to record a scene at the beach and people eating in the viewing pod would then have the experience of dining at the beach.

As shown, the plurality of side projectors 1204 are positioned to project images onto both a dome portion of the viewing pod 1200 and the side walls of the viewing pod. The plurality of side projectors are in a raised position in relation to the viewing pod as compared to the side projectors that are shown in FIG. 8. This configuration provides for more of an overlap between the projected images on the dome portion of the viewing pod. It should be understood that this could similarly be done to the viewing system described above with reference to FIG. 8.

Figure 14:
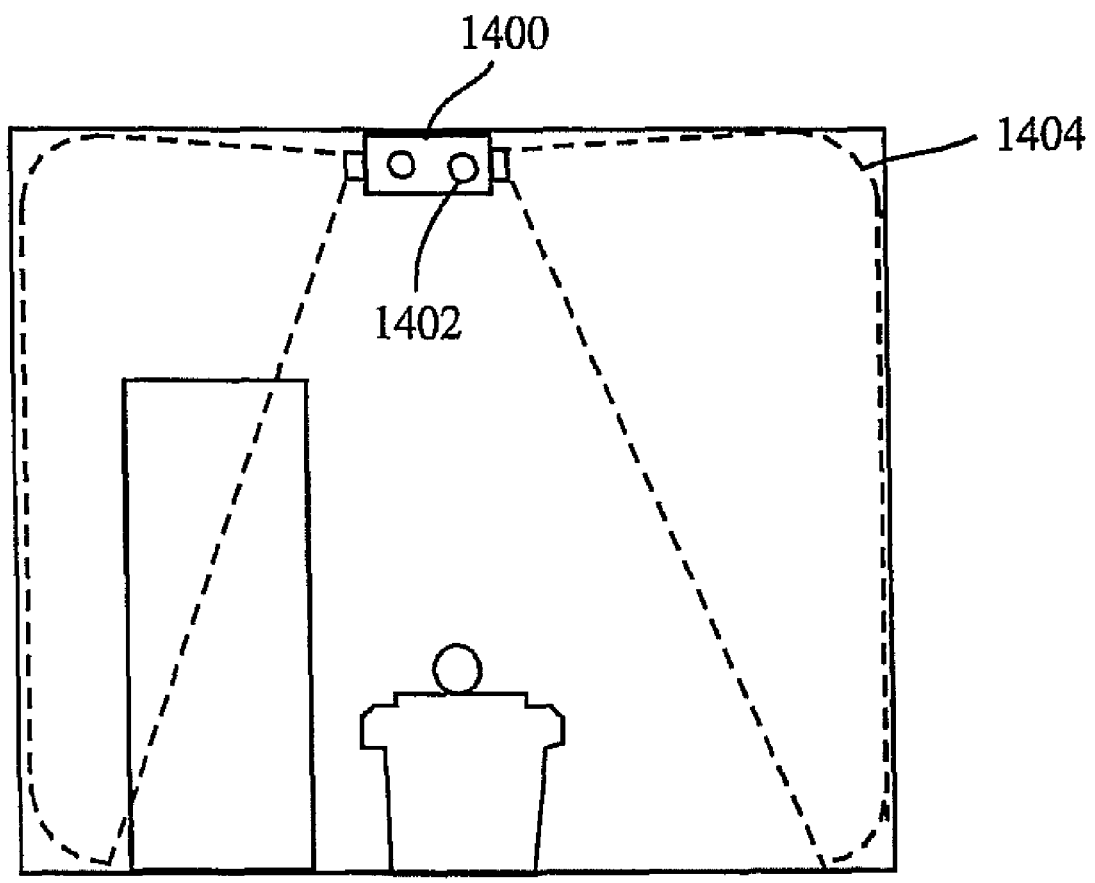
FIG. 14 is a diagram illustrating a room viewing pod in accordance with one embodiment.

Referring to FIG. 14 is a diagram illustrating a room viewing pod in accordance with one embodiment. Shown is a projector chassis 1300, a plurality of projectors 1302 and a room 1304.

Images are projected from the plurality of projectors 1302 that are located at the top and center of the room 1304. The chassis is attached to the ceiling of the room 1304, and the plurality of projectors 1302 are attached to the chassis. The projectors project images onto the ceiling and walls of the room 1304. In one embodiment, the corners of the room have a rounded between the walls and the ceiling and between the walls and the floor in order to better display the images from the projectors 1302. This embodiment provides for a partial projection on the ceiling and floor and full projection on all the walls.

Figure 15:
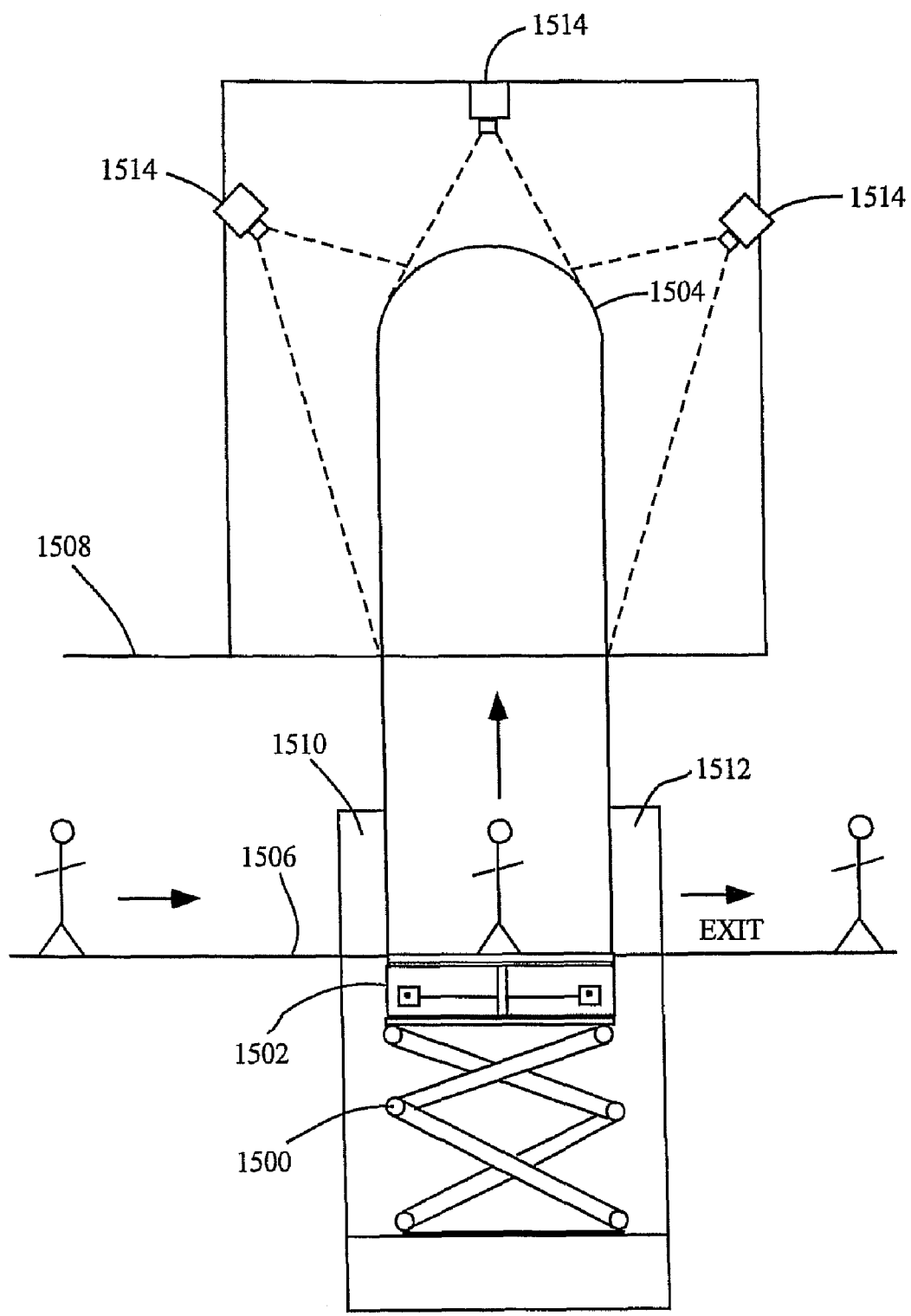
FIG. 15 is a diagram illustrating a theme park viewing pod in accordance with one embodiment.

Referring to FIG. 15 a diagram is shown illustrating a theme park viewing pod in accordance with one embodiment. Shown is a lift 1500, a base 1502, a viewing pod 1504, an entrance level 1506, an viewing level 1508, an entrance 1510, an exit 1512, and a plurality of projectors 1514.

The lift 1500 is coupled to the base 1502 and moves the base 1502 from the entrance level 1506 up into the viewing pod 1504 that is located on the viewing level 1508. The base 1502 can be stationary or movable (such as is shown in FIGS. 9 and 10). In operation, one or more people come through the entrance 1510 and stand on the base 1502. The lift 1500 then raises the base 1502 and the person into the viewing pod 1504 that is located on the viewing level 1508. The projectors 1514 then project an image or video onto the viewing pod 1504. Once the video is finished, the lift 1500 lowers the base 1502 back to the entrance level 1506. The person can then leave through the exit 1512. In one embodiment, the entrance 1510 and exit 1512 are doors that open and shut automatically so that the person does not have to open and close the doors. The viewing pod 1504 can be used in theme parks and provides an efficient manner for moving people into and out of the viewing pod 1504.

In this example, multiple viewing pods can be set up in order to allow more people to enjoy the viewing experience in a shorter period of time.

Figure 16:
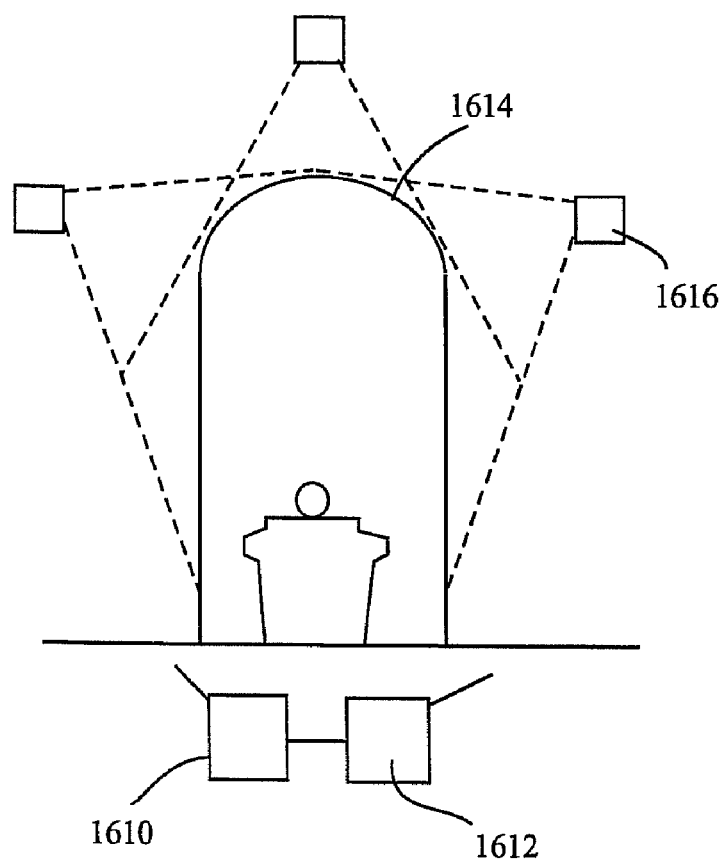
FIG. 16 is a diagram illustrating a teleconference viewing pod in accordance with one embodiment.
Figure 16:
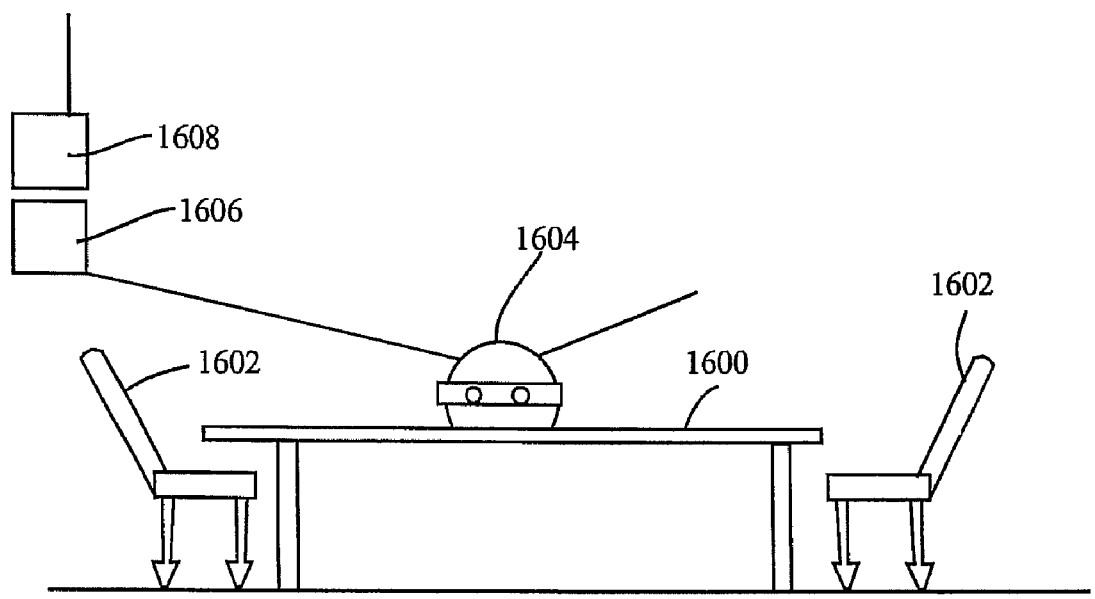

Referring to FIG. 16, a diagram is shown illustrating a teleconference viewing pod system in accordance with one embodiment. Shown is a table 1600, a plurality of chairs 1602, a camera system 1604, a first computer 1606, a first telephone system 1608, a second telephone system 1610, a second computer 1612, a viewing pod 1614 and a plurality of projectors 1616.

The teleconference viewing pod system can be used to create a virtual conference room for a person who is not able to attend a meeting. The camera system 1604 is placed on the table 1600 in a position that the person in the viewing pod 1614 would approximately be sitting. The images from the camera are streamed to the plurality of projectors 1116 from the first computer 1606 to the second computer 1612. Additionally, a telephone line is established utilizing the first telephone system 1606 and the second telephone system 1610. The person in the viewing pod 1614 sees everyone who is at the meeting as if they were actually at the meeting. Streaming video and video teleconferencing systems are know in the art and thus will not be described herein in greater detail.

Figure 17:
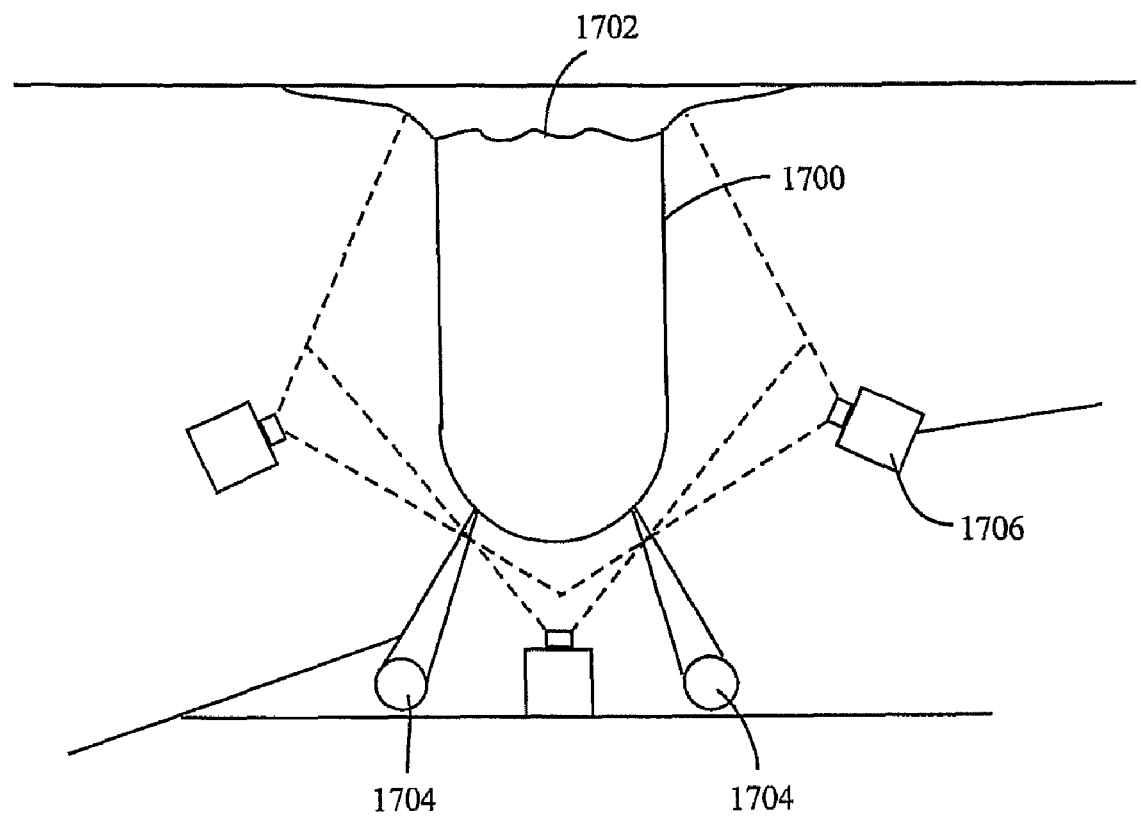
FIG. 17 is a diagram illustrating an underwater viewing pod in accordance with one embodiment.

Referring to FIG. 17, a diagram is shown illustrating an underwater viewing pod in accordance with one embodiment. Shown is a viewing pod 1700, water 1702, supports 1704, and a plurality of projectors 1706.

The viewing pod 1700 is filled with the water 1702 and acts as a water tank. An underwater scene is then projected onto the viewing pod 1700 from the plurality of projectors. A person is able to free dive, snorkel or scuba dive in the viewing pod and experience, for example, a coral reef as if they were actually at the coral reef. The supports 1704 provide structural support the viewing pod 1700.

Figure 18:
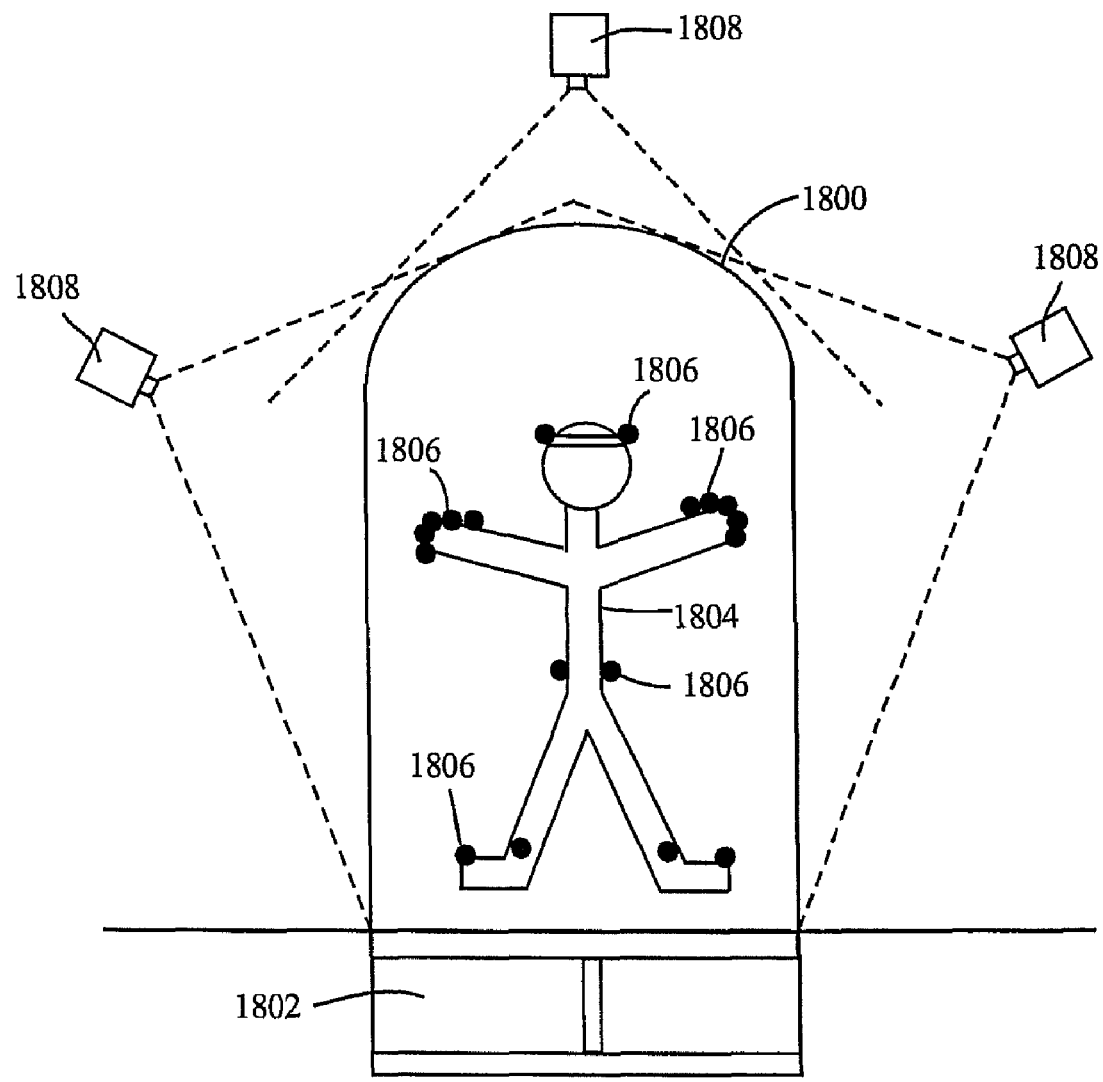
FIG. 18 is a diagram illustrating a gaming viewing pod in accordance with one embodiment.

Referring to FIG. 18, a diagram is shown illustrating a gaming viewing pod in accordance with one embodiment. Shown is a viewing pod 1800, a base 1802, a person 1804, multiple sensors 1806, and a plurality of projectors 1808.

In this embodiment, video game images are projected onto the viewing pod 1800 from the projectors 1808. The sensors 1806 are hooked up to the person 1804 and measure body movement which is relayed back to, for example, a computer that is running a video game. Optionally, the person 1804 is provided with a game controller or other interaction device instead of or in addition to the sensors 1806. The base 1802 of the floor can move as described in FIGS. 9 and 10.

Figure 19:
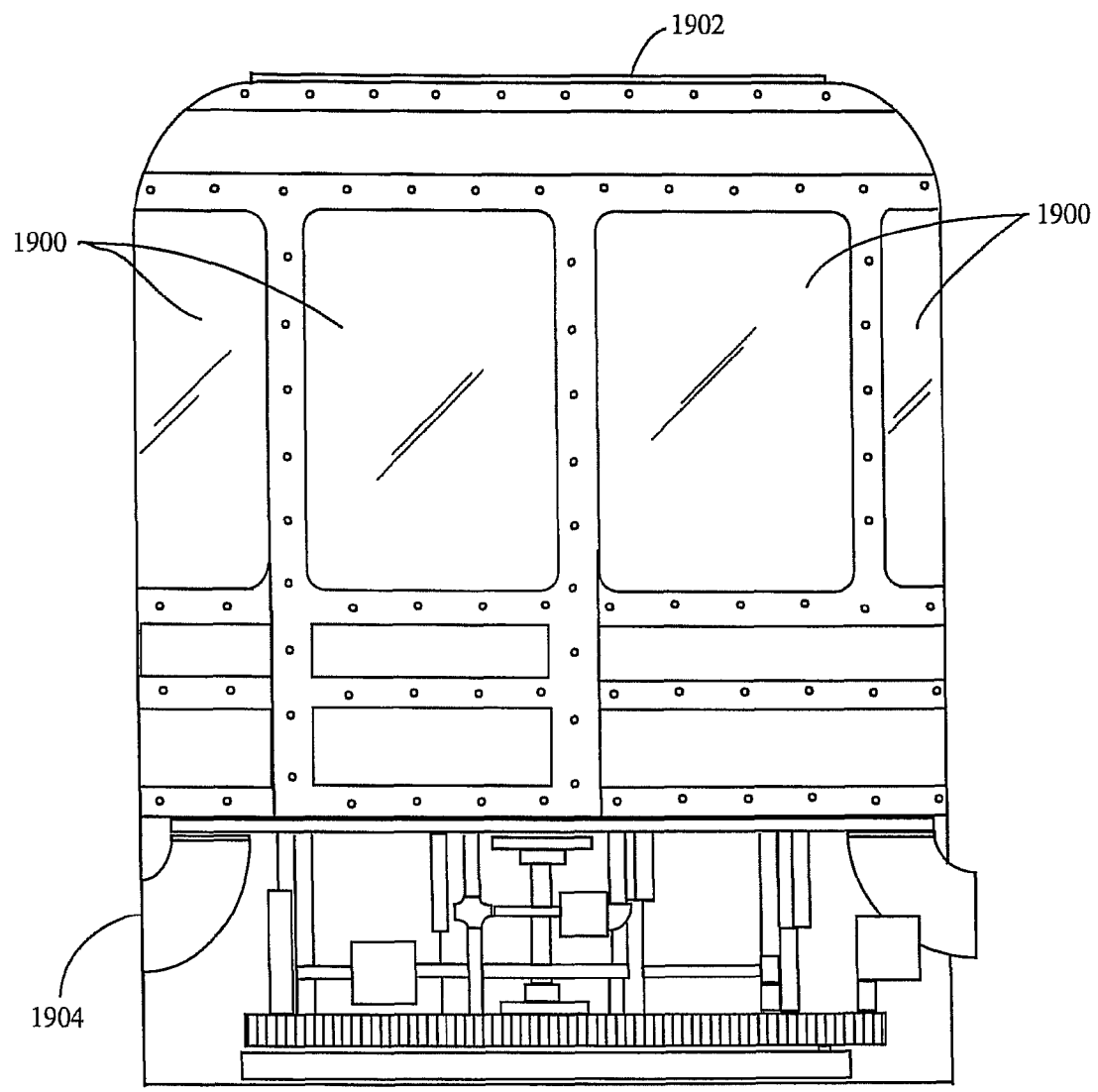
FIG. 19 is a diagram illustrating a panel viewing pod in accordance with one embodiment.
Figure 20:
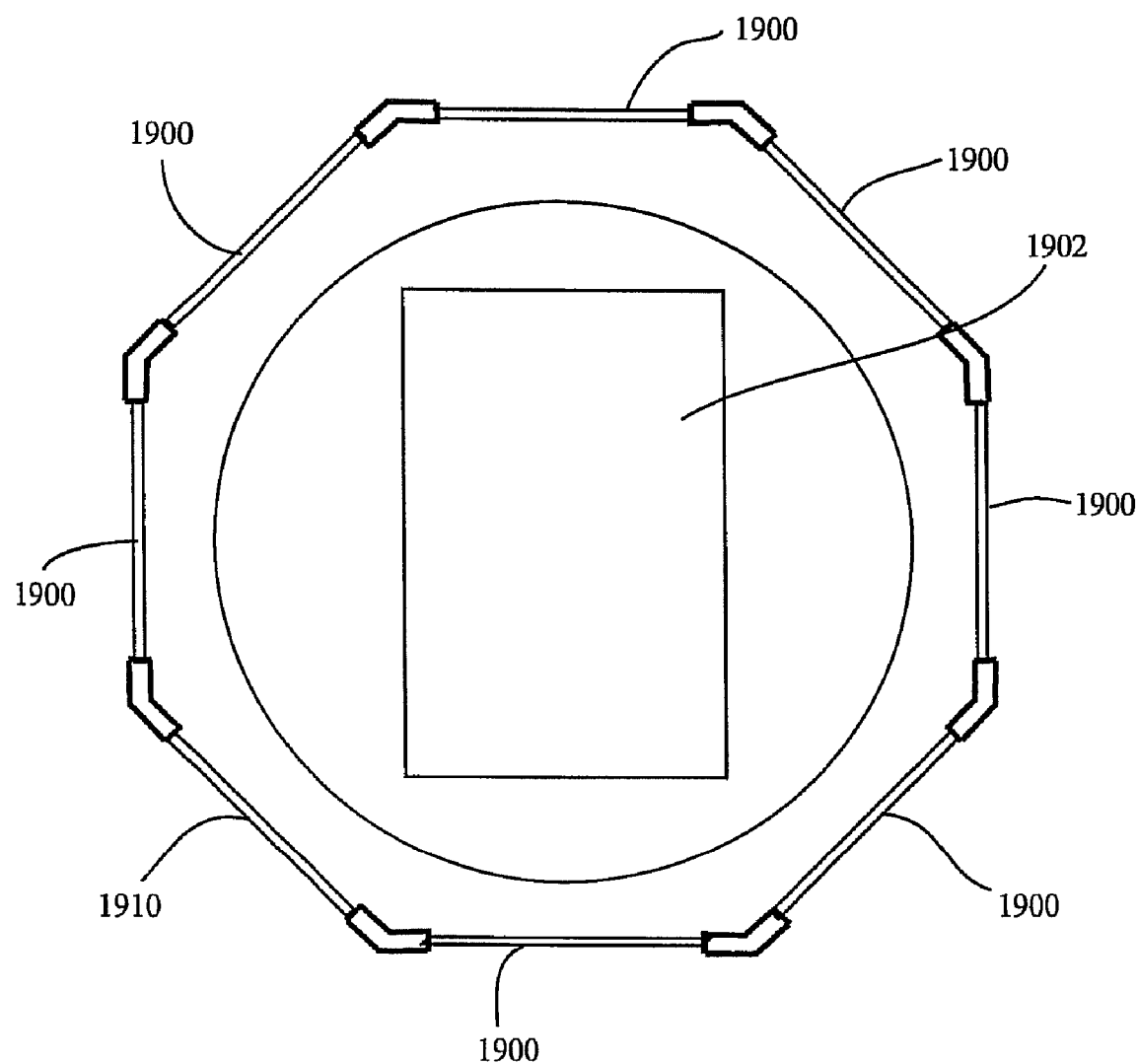
FIG. 20 is a diagram illustrating a top view of the panel viewing pod of FIG. 19.

Referring to FIG. 19 is a diagram illustrating a panel viewing pod in accordance with one embodiment. FIG. 20 is a diagram illustrating a top view of the panel viewing pod of FIG. 190. Shown is a plurality of side panels 1900, a top panel 1902, and a base area 1904. The base area is the same as described and shown in FIGS. 9 and 10. The plurality of side panels 1900 and the top panel 1902 are display screens that are viewed from inside the panel viewing pod. The display screens are, for example, high definition viewing monitors such as plasma screens, liquid crystal displays, or other display screens such as are know in the art. In this embodiment, a viewing does not have a seamless viewing environment. However, the viewing pod still provides substantially a three-hundred-sixty degree viewing area and a top viewing area. In one embodiment, the images shown on each of the side panels 1900 are, for example, images recorded by the plurality of side cameras on the camera system shown in FIG. 1. The images shown on the top panel are the images from the top camera of the camera system shown in FIG. 1.

The viewing pod shown in FIGS. 19 and 20 is particularly suitable for a video game system, for a simulator system or for other systems where the images are generated as compared to being previously recorded images.

Optionally, the viewing pod also includes a floor screen. For example, a plasma or LCD screen can be positioned in the floor and covered by glass. The floor screen is utilized to show, for example, video recorded with the bottom camera described above with reference to FIG. 6.

In one embodiment, more than one top panel is provided. For example, in one embodiment, three top panels are included in the viewing pod. This embodiment can be utilized, for example, with a camera system that includes eight horizontally aligned cameras and three cameras that are aligned to capture images in different directions above the horizontally aligned cameras.

Optionally, the display screens are flexible display screen that can be used to create a viewing pod that is similar in shape and viewing area to the viewing pod shown in FIG. 8. This provides for a curved viewing surface similar to the viewing pod that utilizes projectors.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

I claim:

1. A system for displaying video comprising:
   an enclosure including side walls and at least one of a top and a bottom each having an inside and an outside surface; and
   a plurality of projectors located outside of the enclosure for projecting video onto the outside surface of the side walls and at least one of the top and the bottom, wherein each of the plurality of projectors projects video images onto the enclosure such that each image from each of the plurality of projectors overlaps an area of and less than all of each neighboring image projected from adjacent projectors of the plurality of projectors;
   wherein the video is viewable on the inside surface of the side walls and at least one of the top and the bottom.

2. The system of claim 1 wherein the enclosure includes the top, wherein the top is dome shaped.

3. The system of claim 2 further comprising a movable floor such that the floor moves while the side walls remain stationary, wherein the floor moves in synchronization with the video.

4. The system of claim 1 wherein the overlapped areas of each pair of overlapping images are substantially identical.

5. The system of claim 4 wherein the enclosure includes the bottom, wherein the bottom is dome shaped.

6. The system of claim 5 wherein the enclosure is filled with water and wherein the video is viewable on the inside surface of the side walls and the bottom.

7. The system of claim 4, wherein the overlapped areas of each pair of overlapping images establish a seamless image such that boundaries of each neighboring image overlap producing an image without a seam.

8. The system for displaying video of claim 7 further comprising a bottom, the bottom comprising a separate display device on to which viewers are positioned and that displays content consistent with the plurality of images projected by the plurality of projectors onto the side viewing area and the least one of a top viewing area and a bottom viewing area; and wherein the bottom detaches from the side walls and moves in a direction generally parallel to the side walls to move viewers in and out of the viewing area.

9. The system of claim 8, wherein the bottom further rotates in coordination with the displayed overlapped images.

10. The system of claim 9, further comprising:
a computer;
a plurality of movable supports that support and move the bottom;
a plurality of cams;
a plurality of transfer members; and
a plurality of motors;
wherein the plurality of movable supports are coupled to the plurality of motors through the plurality of cams and the plurality of transfer members, and the plurality of motors in combination with the plurality of movable supports, the plurality of cams and the plurality of transfer members control movement of the bottom in synchronization with the overlapped images as controlled by the computer.

11. The system of claim 7, wherein each of the plurality of projectors projects the video images such that each image overlaps at least two neighboring images.

12. A system for displaying video comprising:
a side viewing area that provides substantially a three-hundred-sixty degree viewing area and forms at least part of a viewing pod;
at least one of a top viewing area and a bottom viewing area that forms a least a part of the viewing pod, wherein the at least one bottom viewing area is movable independent of the side viewing area; and
a plurality of projectors distributed about the side viewing area and the at least one of the top viewing area and the bottom viewing area, where the plurality of projectors project different images onto the side viewing area and the at least one of the top viewing area and the bottom viewing area, and wherein each of the plurality of projectors projects images onto the viewing pod such that each image from each of the plurality of projectors projected at a single time overlaps an area of and less than all of each neighboring image projected from each adjacent projector such that each image overlaps at least two neighboring images.

13. The system for displaying video of claim 12 wherein the side viewing area and at least one of the top viewing area and the bottom viewing area provide a seamless viewing environment and the overlapped areas of each pair of overlapping images establish a seamless image such that boundaries of each neighboring image overlap such that there is no seam between images.

14. The system for displaying video of claim 13 wherein the bottom comprising a separate display device on which viewers are positioned and that displays content consistent with the plurality of images projected by the plurality of projectors onto the side viewing area and the least one of a top viewing area and a bottom viewing area; and wherein the movable bottom viewing area detaches from the side walls and moves in a direction generally parallel to the side walls to move viewers in and out of the viewing area.

15. The system of claim 13 wherein the overlapped areas of each pair of overlapping images are identical such that boundaries of each neighboring image overlap producing an image without a seam.

16. The system of claim of claim 15, further comprising:
a first telephone system cooperated with the viewing pod;
a first computer system cooperated with the viewing pod and the plurality of projectors;
a remote camera system located at a remote location that is separate from and distant from the viewing pod, where the remote camera is positioned at a relative position where a viewer, if located at the remote location, would be positioned;
a second remote telephone system located at the remote location and adapted to provide communication with the first telephone system;
a second computer system located at the remote location and cooperated with the remote camera system, where the second computer system is adapted to communicate images from the camera system to the first computer system;
wherein the first computer system is adapted to receive the communicated images from the second computer system and distribute the images to the plurality of projectors; and
wherein the plurality of projectors project the images onto the viewing pod such that the viewer sees the images as if the viewer were actually at the remote location and at the position of the camera system.

17. The system of claim 16, wherein the viewing pod is a teleconference viewing pod comprising the viewing pod, the plurality of projectors, the first computer and the first telephone system, such that the images displayed on the teleconference viewing pod provides an appearance to a viewer of being at the remote location.

18. The system for displaying video of claim 12, further comprising one or more sensors connectable to a viewer, wherein the sensors measure the body movement of the viewer to at least in part control the playback based on the body movement of the viewer.

* * * * *

UNITED STATES PATENT AND TRADEMARK OFFICE
CERTIFICATE OF CORRECTION

Page 1 of 1

PATENT NO. : 7,884,848 B2
APPLICATION NO. : 11/138597
DATED : February 8, 2011
INVENTOR(S) : Ginther It is certified that error appears in the above-identified patent and that said Letters Patent is hereby corrected as shown below:

On the title page item (57),
Column 2, ABSTRACT, line 12, delete "atop" and insert --a top--.
In the CLAIMS:
Claim 8, column 13, line 1, after "and" delete "the" and insert --at--.
Claim 12, column 13, line 31, delete "a least" and insert --at least--.
Claim 14, column 14, line 5, delete "the" and insert --at--. second occurrence Signed and Sealed this
Tenth Day of May, 2011

David J. Kappos
*Director of the United States Patent and Trademark Office*